United States Patent
Hamamoto et al.

(10) Patent No.: US 7,558,249 B2
(45) Date of Patent: Jul. 7, 2009

(54) COMMUNICATION TERMINAL, AND COMMUNICATION METHOD

(75) Inventors: Moe Hamamoto, Osaka (JP); Takeshi Kokado, Kyoto (JP); Manabu Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 285 days.

(21) Appl. No.: 11/666,894

(22) PCT Filed: Nov. 4, 2005

(86) PCT No.: PCT/JP2005/020304

§ 371 (c)(1),
(2), (4) Date: May 3, 2007

(87) PCT Pub. No.: WO2006/049251

PCT Pub. Date: May 11, 2006

(65) Prior Publication Data

US 2008/0112417 A1    May 15, 2008

(30) Foreign Application Priority Data

Nov. 8, 2004  (JP) .............................. 2004-323354

(51) Int. Cl.
*H04L 12/28* (2006.01)

(52) U.S. Cl. ............. 370/351; 370/395.53; 370/395.54; 709/227; 709/245; 709/250

(58) Field of Classification Search ................. 370/351, 370/395.53, 395.54; 709/227, 245, 250
See application file for complete search history.

(56) References Cited

U.S. PATENT DOCUMENTS 7,328,280 B2 * 2/2008 Takeda et al. ............... 709/245
7,457,293 B2 * 11/2008 Kokado ...................... 370/392
2002/0152325 A1 * 10/2002 Elgebaly et al. ............. 709/246
2004/0024879 A1 * 2/2004 Dingman et al. ............ 709/227

(Continued)

FOREIGN PATENT DOCUMENTS

JP    2004-104357    4/2004
JP    2004-180003    6/2004

OTHER PUBLICATIONS

International Search Report for PCT/JP2005/020304. Mailing date Jan. 10, 2006. Issued May 8, 2007. Japanese Patent Office.*
Internet Engineering Task Force, Internet Draft; "Symmetric NAT Traversal using STUN"; MIDCOM WG; Y. Takeda, Panasonic Communications Research Laboratory, Jun. 2003. <draft-takeda-symmetric-nat-traversal-00.txt>.*

*Primary Examiner*—Hassan Kizou
*Assistant Examiner*—Benjamin Elliott
(74) *Attorney, Agent, or Firm*—Wenderoth, Lind & Ponack, L.L.P.

(57) ABSTRACT

Provided is a communication terminal capable of establishing a P2P communication path with a communication terminal connected to a different private network. A communication terminal (10) transmits and receives messages to and from a server (30) via a router (11), thereby examining a relay characteristic of the router (11). When the examined relay characteristic of the router (11) is Port Reuse, the communication terminal (10) determines address information, which contains at least a port number of the communication terminal (10), which port number is to be used for P2P communication with a communication terminal (20), to be address information about the router. The communication terminal (10) exchanges the determined address information about the router (11) with the communication terminal (20). Based on the exchanged address information, the communication terminal (10) establishes a P2P communication path with a communication terminal (20).

10 Claims, 16 Drawing Sheets

U.S. PATENT DOCUMENTS

| | | |
|---|---|---|
| 2004/0253970 A1 | 12/2004 | Kunihiro |
| 2005/0100001 A1* | 5/2005 | Liu .......................... 370/352 |
| 2005/0105543 A1* | 5/2005 | Ikenaga et al. .............. 370/428 |
| 2006/0075127 A1* | 4/2006 | Juncker et al. .............. 709/229 |

* cited by examiner

F I G. 3 B
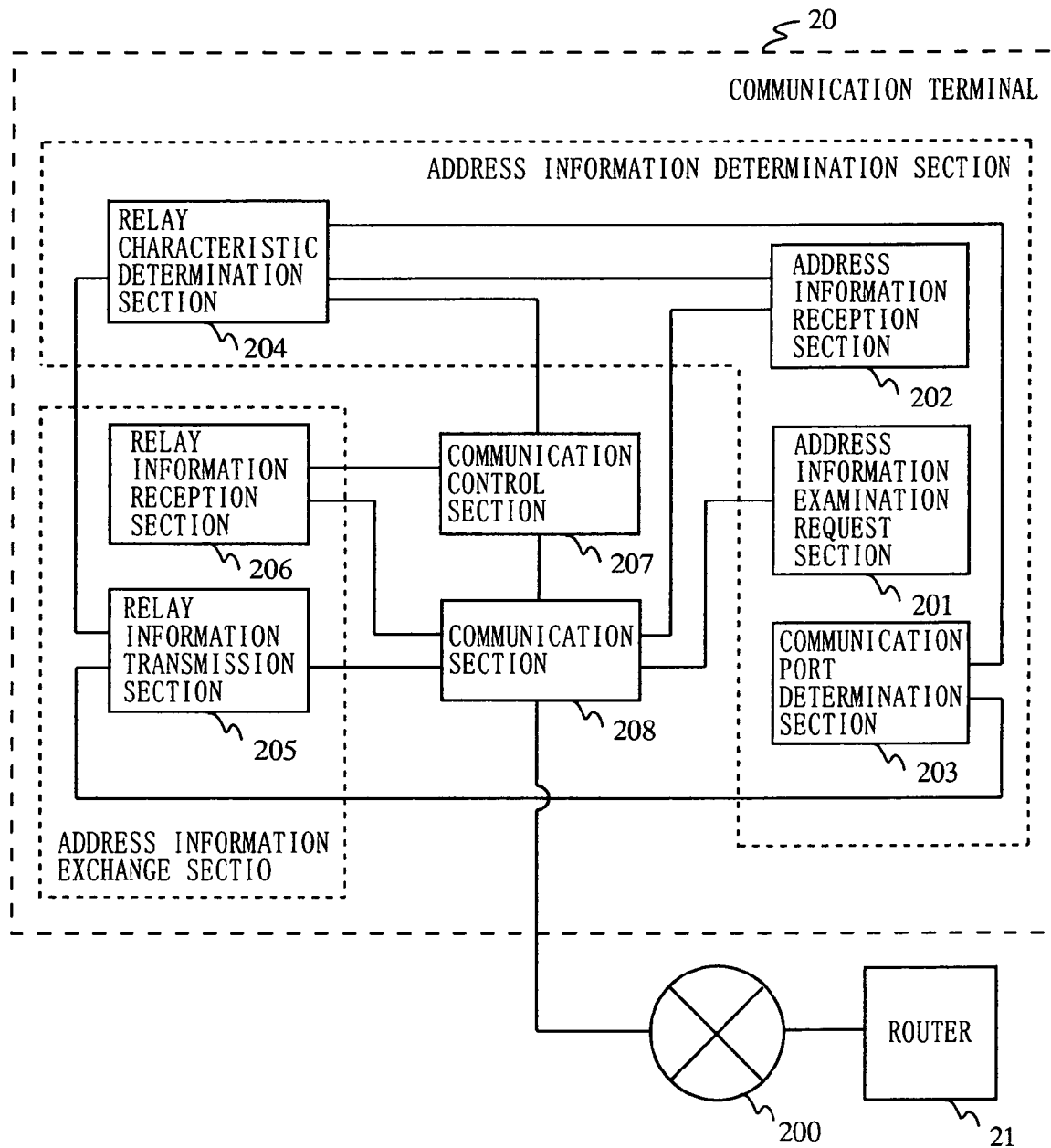

FIG. 8 PRIOR ART
(a)
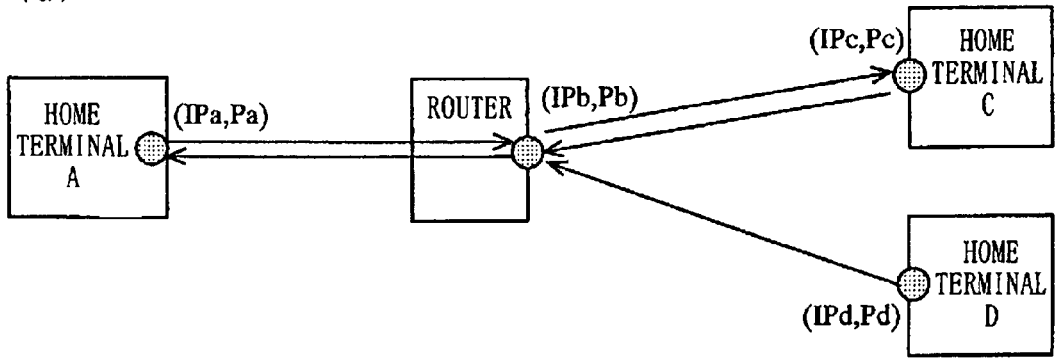
(b)
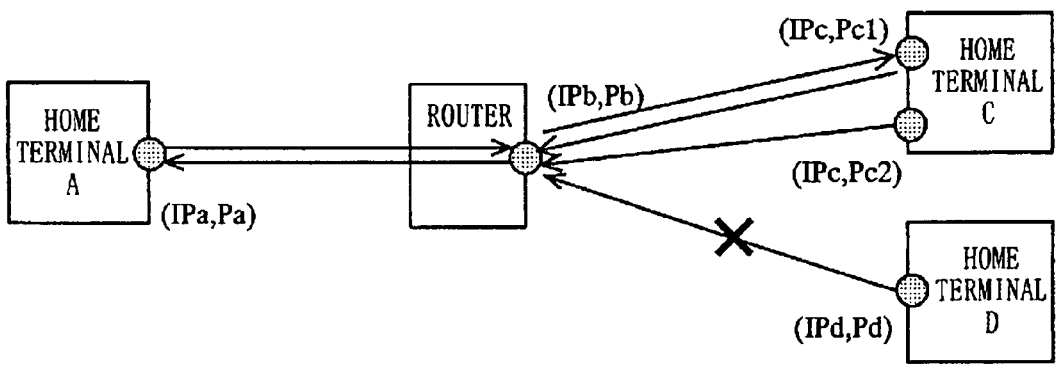
(c)
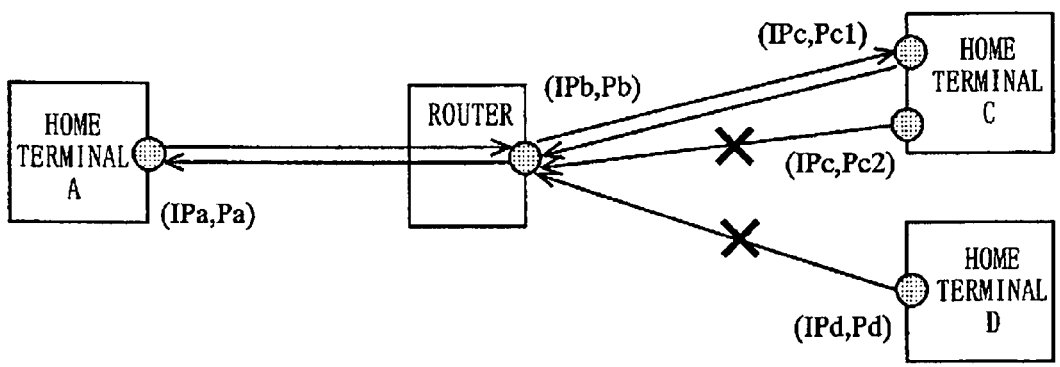
(d)
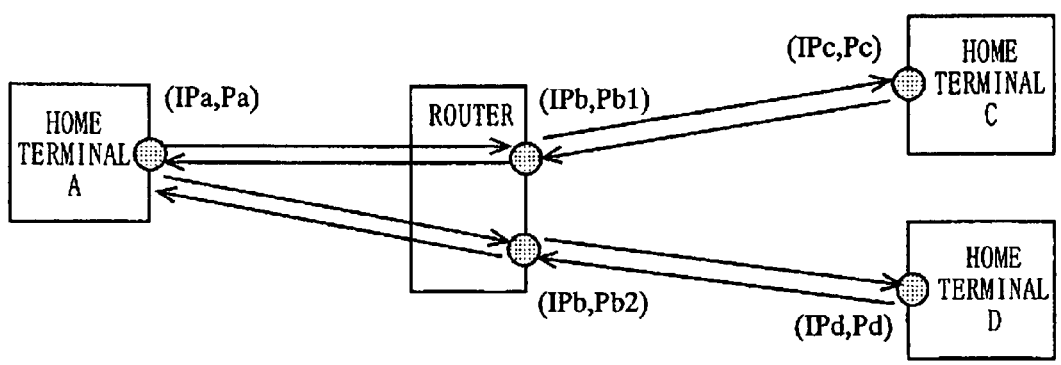

F I G. 1 1 PRIOR ART

COMMUNICATION TERMINAL, AND COMMUNICATION METHOD

TECHNICAL FIELD

The present invention relates to a communication terminal and a communication method, and more particularly relates to a communication terminal and a communication method for performing, via a router, a one-to-one interconnection with a communication terminal on another network.

BACKGROUND ART

An IP address, which is uniquely determined within the entire network and which enables a one-to-one (peer-to-peer, hereinafter referred to as P2P) interconnection to be established, is called a global IP address. On the other hand, an IP address, which is a non-global IP address uniquely determined only within a particular network and which cannot be used for P2P communication with another network, is called a private IP address. A network made up of such private IP addresses is called a private network.

There is a common method for enabling a communication terminal having a private IP address to communicate with an external communication terminal having a global IP address, in which method a communication terminal (router) having a Network Address Translation (hereinafter, referred to as NAT) function or a Network Address Port Translation (hereinafter, referred to as NAPT) function is placed between a private network and external global network. Note that, the term NAT referred to in the below description contains concepts of both NAT and NAPT.

It is known that there are a plurality of types of NAT. Hereinafter, the types of NAT will be described with reference to FIG. 8. FIG. 8(a) shows a type of NAT called Full Cone NAT. As shown in FIG. 8(a), a router having a Full Cone NAT function always allocates a same port number [Pb] of the router to packets, which are transmitted from same address information [IPa, Pa] of a home terminal A to outside home, and then transmits the packets to an external network. Also, the router transfers all packets, which are transmitted to address information [IPb, Pb] from unspecified external terminals C and D connected to the external network, to the home terminal A [IPa, Pa].

FIG. 8(b) shows a type of NAT called Restricted Cone NAT. As shown in FIG. 8(b), a router having a Restricted Cone NAT function always allocates the same port number [Pb] of the router to packets, which are transmitted from the same address information [IPa, Pa] of the home terminal A to outside home, and then transmits the packets to the external network. Note that, unlike the Full Cone NAT router, the router only transfers a packet, which is transmitted to the address information [IPb, Pb] from an IP address [IPc] of the external terminal C to which the home terminal A has previously transmitted a packet, to the home terminal A [IPa, Pa]. At this point, a port number of the external terminal C may be any number.

FIG. 8(c) shows a type of NAT called Port Restricted Cone NAT. As shown in FIG. 8(c), a router having a Port Restricted Cone NAT function always allocates the same port number [Pb] of the router to packets, which are transmitted from the same address information [IPa, Pa] of the home terminal A to outside home, and then transmits the packets to the external network. Here, unlike the Restricted Cone NAT router, the router only transfers a packet, which is transmitted to the address information [IPb, Pb] from a port number [Pc1] of the external terminal C to which the home terminal A has previously transmitted a packet, to the home terminal A [IPa, Pa]. At this point, the router discards all packets transmitted from any other port number than [Pc1] (e.g., [Pc2]) even if the packets are transmitted from the same external terminal C.

FIG. 8(d) shows a type of NAT called Symmetric NAT. As shown in FIG. 8(d), a router having a Symmetric NAT function allocates a specific port number of the router to packets, which are transmitted from the same address information [IPa, Pa] of the home terminal A to a port number of a specific external terminal, and then transmits the packets to the external network. For example, the router allocates a port number [Pb1] of the router to a packet which is transmitted from the home terminal A [IPa, Pa] to the external terminal C [IPc, Pc]. Further, the router allocates a port number [Pb2] of the router to a packet which is transmitted from the home terminal A [IPa, Pa] to the external terminal D [IPd, Pd]. Similarly to the Port Restricted Cone NAT router, the router only transfers a packet, which is transmitted from a port number of an external terminal to which the home terminal A has previously transmitted a packet, to the home terminal A [IPa, Pa].

By using these NAT functions of router, a home terminal within a private network is able to communicate, using a private IP address, with an external terminal on a global network.

However, just placing a router having a NAT function between the private network and global network does not allow a terminal having a private IP address to perform P2P communication with a terminal existing in a different private network. Here, there is a method, which is disclosed by RFC3489 and in which STUN (Simple Traversal UDP through NAT) is used, for allowing terminals respectively existing in different private networks to realize P2P communication beyond NAT functions of routers thereof. In the description below, the term "packet" always refers to "UDP packet", and all messages are transmitted and received using UDP packets.

FIG. 9 shows a sequence of operations which are performed between terminals in order to realize P2P communication by using the method in which STUN is used. Here, routers 1 and 2 shown in FIG. 9 are not Symmetric NAT routers. As shown in FIG. 9, a terminal 1 transmits an IP/Port registration request to a server (step S501). The server registers therein source address information (i.e., a source IP address and source port number) about a received packet (step S502). Here, the server registers therein address information [IPG1, GP1] which is a result of conversion, performed by the NAT of the router 1, of address information about the terminal 1 from [IPL1, LP1] to [IPG1, GP1] which is address information about the router 1.

Similarly, a terminal 2 transmits an IP/Port registration request to the server (step S503). The server registers therein source address information (i.e., a source IP address and source port number) about a received packet (step S504). Here, the server registers therein address information [IPG2, GP2] which is a result of conversion, performed by the NAT of the router 2, of address information about the terminal 2 from [IPL2, LP2] to [IPG2, GP2] which is address information about the router 2.

Next, in order to obtain address information for accessing the terminal 1, the terminal 2 transmits an IP/Port obtain request to the server (step S505). In response, the server returns, to the terminal 2, an IP/Port obtain response in which the address information [IPG1, GP1] registered at step S502 is set (step S506).

Upon obtaining the address information [IPG1, GP1] for accessing the terminal 1, the terminal 2 transmits a P2P start request to the obtained address information [IPG1, GP1] (step S507). The router 2 relays, to the router 1, the P2P start request transmitted from the terminal 2. Here, when the router 1 is a Full Cone NAT router, the P2P start request transmitted from the terminal 2 is transferred to the terminal 1, and then a P2P communication path is established between the terminals 1 and 2.

On the other hand, when the router 1 is not a Full Cone NAT router, the P2P start request transmitted from the terminal 2 is discarded by the router 1 without being transferred to the terminal 1 [IPL1, LP1].

However, at the time of relaying the P2P start request transmitted from the terminal 2, the NAT of the router 2 is set so as to transfer a packet, which is directed in the opposite direction to that of the relayed P2P start request, to the terminal 2. To be specific, in the case where the router 2 is a Full Cone NAT router, the NAT of the router 2 is set so as to transfer a packet, which the router 2 [IPG2, GP2] receives from the terminal 1 via the router 1 [IPG1, GP1], to the terminal 2 [IPL2, LP2]. Also, in the case where the router 2 is a Restricted Cone NAT router, the NAT of the router 2 is set so as to transfer a packet, which the router 2 [IPG2, GP2] receives from a source IP address [IPG1], to the terminal 2 [IPL2, LP2]. Further, in the case where the router 2 is a Port Restricted Cone NAT router, the NAT of the router 2 is set so as to transfer a packet, which the router 2 [IPG2, GP2] receives from the terminal 1 via the router 1 [IPG1, GP1], to the terminal 2 [IPL2, LP2].

Next, in order to obtain address information for accessing the terminal 2, the terminal 1 transmits an IP/Port obtain request to the server (step S508). In response, the server returns, to the terminal 1, an IP/Port obtain response in which the address information [IPG2, GP2] registered at step S504 is set (step S509).

Upon obtaining the address information [IPG2, GP2] for accessing the terminal 2, the terminal 1 transmits a P2P start request to the obtained address information [IPG2, GP2] (step S510. The router 1 relays, to the router 2, the P2P start request transmitted from the terminal 1. As described above, the NAT of the router 2 has been set so as to transfer a packet, which the router 2 [IPG2, GP2] receives from the terminal 1 via the router 1, to the terminal 2 [IPL2, LP2]. For this reason, the router 2 is able to transfer, to the terminal 2, the P2P start request transmitted from the terminal 1.

Also, at the time of relaying the P2P start request transmitted from the terminal 1, the NAT of the router 1 is set so as to transfer a packet, which is directed in the opposite direction to that of the relayed P2P start request, to the terminal 1. To be specific, in the case where the router 1 is a Restricted Cone NAT router, the NAT of the router 1 is set so as to transfer a packet, which the router 1 [IPG1, GP1] receives from a source IP address [IPG2], to the terminal 1 [IPL1, LP1]. Further, in the case where the router 1 is a Port Restricted Cone NAT router, the NAT of the router 1 is set so as to transfer a packet, which the router 1 [IPG1, GP1] receives from the terminal 2 via the router 2 [IPG2, GP2], to the terminal 1 [IPL1, LP1].

Upon receiving the P2P start request, the terminal 2 transmits a P2P start response to the terminal 1 (step S511). At this point, as described above, the NAT of the router 1 has been set so as to transfer a packet, which the router 1 [IPG1, GP1] receives from the terminal 2 via the router 2, to the terminal 1 [IPL1, LP1]. For this reason, the router 1 is able to transfer, to the terminal 1, the P2P start response transmitted from the terminal 2. This is the method for, when the routers 1 and 2 are not Symmetric NAT routers, establishing a P2P communication path by using STUN.

In the case where a Symmetric NAT router is present on the path between the terminals 1 and 2, the following problem occurs when a P2P communication path is established using STUN. Hereinafter, the problem will be described with reference to FIGS. 10 and 11. FIG. 10 illustrates a problem occurring when the router 1 is a Symmetric NAT router. FIG. 11 illustrates a problem occurring when the router 2 is a Symmetric NAT router.

As shown in FIG. 10, processes of steps S601 to S604 are the same as those of the steps S501 to S504 in FIG. 9. Therefore, descriptions thereof will be omitted. In the following step, the terminal 2 transmits an IP/Port obtain request to the server in order to obtain address information for accessing the terminal 1 (step S605). In response, the server returns, to the terminal 2, an IP/Port obtain response in which the address information [IPG1, GP1] registered at step S602 is set (step S606).

Upon obtaining the address information [IPG1, GP1] for accessing the terminal 1, the terminal 2 transmits a P2P start request to the obtained address information [IPG1, GP1] (step S607.

The router 2 relays, to the router 1, the P2P start request transmitted from the terminal 2. Here, since the router 1 is a Symmetric NAT router, a packet of the P2P start request transmitted from the terminal 2 is discarded by the router 1 without being transferred to the terminal 1 [IPL1, LP1].

However, at the time of relaying the P2P start request transmitted from the terminal 2, the NAT of the router 2 is set so as to transfer a packet, which is directed in the opposite direction to that of the relayed P2P start request, to the terminal 2. To be specific, in the case where the router 2 is a Full Cone NAT router, the NAT of the router 2 is set so as to transfer a packet, which the router 2 [IPG2, GP2] receives from the terminal 1 via the router 1 [IPG1, GP1], to the terminal 2 [IPL2, LP2]. Also, in the case where the router 2 is a Restricted Cone NAT router, the NAT of the router 2 is set so as to transfer a packet, which the router 2 [IPG2, GP2] receives from the source IP address [IPG1], to the terminal 2 [IPL2, LP2]. Further, in the case where the router 2 is a Port Restricted Cone NAT router, the NAT of the router 2 is set so as to transfer a packet, which the router 2 [IPG2, GP2] receives from the terminal 1 via the router 1 [IPG1, GP1], to the terminal 2 [IPL2, LP2].

Next, in order to obtain address information for accessing the terminal 2, the terminal 1 transmits an IP/Port obtain request to the server (step S608). In response, the server returns, to the terminal 1, an IP/Port obtain response in which the address information [IPG2, GP2] registered at step S604 is set (step S609).

Upon obtaining the address information [IPG2, GP2] for accessing the terminal 2, the terminal 1 transmits a P2P start request to the obtained address information [IPG2, GP2] (step S610.

At this point, since the router 1 is a Symmetric NAT router, the router 1 allocates a port number other than [GP1] (e.g., [GP3]) to the P2P start request transmitted from the terminal 1.

Here, when the router 2 is a Full Cone NAT router or Restricted Cone NAT router, the P2P start request transmitted from the terminal 1 is transferred by the router 2 to the terminal 2 [IPL2, LP2], and then a P2P communication path is established between the terminals 1 and 2. However, when the router 2 is a Port Restricted Cone NAT router or Symmetric NAT router, the P2P start request transmitted from the terminal 1 is discarded by the router 2 without being transferred to the terminal 2. For this reason, a P2P communication path between the terminals 1 and 2 fails to be established.

Also, in the case where the router 2 is a Symmetric NAT router (see FIG. 11), a P2P communication path fails to be established for the same reason.

As described above, in the case where either the router 1 or router 2 is a Symmetric NAT router, probability of successfully establishing a P2P communication path by using STUN is not high. In order to solve such a problem, a conventional method, which allows a P2P communication path to be successfully established even if the routers 1 and 2 are Symmetric NAT routers, has been disclosed (e.g., Patent Document 1).

FIG. 12 is a sequence diagram showing a process, in the conventional method, for establishing a P2P communication path. As shown in FIG. 12, processes of steps S801 to S804 are the same as those of the steps S501 to S504 in FIG. 9. Therefore, descriptions thereof will be omitted. In order to request the terminal 1 to perform P2P communication, the terminal 2 transmits a P2P communication request to the server (step S805). At this point, the terminal 2 changes a source port number, which the terminal 2 uses for the P2P communication request, from the source port number [LP2], which has been used for the IP/Port obtain request, to a source port number [LP2+a]. Here, a is an arbitrary integer.

The reason for the terminal 2 to use the new port number [LP2+a] is to cause the router 2 to use a new source port number [GP2+b] as a source port number of the P2P communication request. Here, b is an indeterminate incremental value of the NAT of the router 2.

Upon receiving the P2P communication request, the server transmits, to the terminal 1, an IP/Port notification in which the address information [IPG2, GP2+b] is set (step S806).

Upon receiving the IP/Port notification, the terminal 1 transmits a P2P start permission to the server in the case where the terminal 1 permits the P2P communication (step S807). At this point, the terminal 1 changes a source port number, which the terminal 1 uses for the P2P start permission, from the source port number [LP1], which has been used for the IP/Port obtain request, to a source port number [LP1+d], and then transmits the P2P start permission. The reason for the terminal 1 to use the new port number [LP1+d] is to cause the router 1 to use a new source port number [GP1+d] as a source port number of the P2P communication permission. Here, d is an arbitrary integer which is an indeterminate incremental value of the NAT of the router 1.

Further, upon obtaining, through the IP/Port notification, the address information [IPG2, GP2+b] for accessing the terminal 2, the terminal 1 transmits a P2P start request to the obtained address information [IPG2, GP+2+b+n] (step S808).

Note that, at steps S807 and S808, the P2P communication permission and P2P start request are successively transmitted within an extremely short time period. For this reason, when the source port number of the P2P communication permission is converted from [LP1+c] to [GP1+d] by the router 1, the source port number of the P2P start request is converted from [LP1+c+1] to [GP1+d+1].

Also, at the time of relaying the P2P start request transmitted from the terminal 1, the NAT of the router 1 is set so as to transfer a packet, which is directed in the opposite direction to that of the relayed P2P start request, to the terminal 1. To be specific, the NAT of the router 1 is set so as to transfer a packet, which the router 1 [IPG1, GP1+d+1] receives from the terminal 2 via the router 2 [IPG2, GP2+b+n], to the terminal 1 [IPL1, LP1+c+1]. Here, n is an arbitrary integer value.

Upon receiving the P2P communication permission transmitted from the terminal 1 at step S807, the server transmits, to the terminal 2, IP/Port obtain response in which the address information [IPG1, GP1+d] of the router 1 is set (step S809).

Next, upon receiving, through the IP/Port obtain response, the address information [IPG1, GP1+d] for accessing the terminal 1 (i.e., the address information about the router 1), the terminal 2 immediately transmits P2P start requests to the terminal 1 (step S810). At this point, the terminal 2 transmits, to a port number [GP1+d+1] of the router 1, n P2P start requests while causing source port numbers thereof to be incremented one by one from [LP2+a+1]. The source port numbers of the P2P start requests are converted by the router 2 to port numbers [GP2+b+m] to [GP2+b+m+n−1].

Since any of the plurality of P2P start requests transmitted from the terminal 2 corresponds to the setting for the router 1 to transfer, to the terminal 1, a packet directed in the opposite direction, said any of the plurality of P2P start requests is transferred to the terminal 1. Upon receiving said any of the plurality of P2P start requests, the terminal 1 transmits a P2P start response as a response (step S811). As a result, a P2P communication path is established between the terminals 1 and 2.

[Patent Document 1] Japanese Laid-Open Patent Publication No. 2004-180003.

DISCLOSURE OF THE INVENTION

Problems to be Solved by the Invention

However, in the conventional method shown in FIG. 12, the terminal 2 transmits the plurality of P2P start requests at step S810 in order to predict a port number from which the terminal 1 has transmitted a P2P start request at step S808. This causes problems, for example, a period of connection time required for a P2P communication path to be established is prolonged and the amount of traffic is increased. Further, depending on a type of the router 2, there is a case where port numbers, which are allocated to the plurality of P2P start requests transmitted from the terminal 2, vary randomly. In this case, the port numbers allocated to the P2P start requests transmitted from the terminal 2 are not in numerical order. For this reason, there is a possibility that connectivity of the P2P communication path deteriorates.

Therefore, an object of the present invention is to provide a communication terminal and a communication method which are capable of establishing, in a short period of time and with a small amount of traffic, a P2P communication path with another communication terminal, and realizing high connectivity thereof.

Solution to the Problems

The present invention is directed to a communication terminal, which is present on a private network connected to a global network via a router and which performs a one-to-one interconnection with a communication terminal on another network via the router. In order to achieve the above object, the communication terminal of the present invention comprises an address information determination section, address information exchange section, communication control section and a communication section.

The address information determination section examines a relay characteristic of the router by transmitting and receiving a predetermined message to and from a server which is on the global network, and, based on an examination result, determines address information about the router, which address information is to be used for the one-to-one interconnection with the communication terminal on said another network. The address information exchange section exchanges, with the communication terminal on said another network, the address information about the router which has been determined by the address information determination section. Based on the address information about the router which has been exchanged by the address information exchange section, the communication control section performs the one-to-one interconnection with the communication terminal on said another network. The communication section performs all communications for the communication terminal. When the relay characteristic of the router is Port Reuse, the address information determination section determines address information, which contains at least a port number of the communication terminal, which port number is to be used for the one-to-one interconnection with the communication terminal on said another network, to be the address information about the router.

More particularly, the address information determination section includes an address information examination request section, address information reception section, relay characteristic determination section and a communication port determination section. By transmitting a predetermined message to the server via the router, the address information examination request section requests the server to provide the address information about the router. The address information reception section receives, from the server, the address information about the router as a response to the request. Based on the address information about the router which has been received by the address information reception section, the relay characteristic determination section determines the relay characteristic of the router. Based on the relay characteristic of the router which has been determined by the relay characteristic determination section, the communication port determination section determines a port number of the communication terminal, which port number is to be used for the one-to-one interconnection with the communication terminal on said another network.

Preferably, the address information examination request section successively transmits, from a predetermined port number of the communication terminal, a first port number examination request message to a first port number of the server and a second port number examination request message to a second port number of the server. The address information reception section receives, from the server, a first port number examination response message which is a response to the first port number examination request message and a second port number examination response message which is a response to the second port number examination request message. The relay characteristic determination section determines the relay characteristic of the router in accordance with the first and second port number examination response messages received by the address information reception section.

The first port number examination response message contains an IP address of the router and a source port number of the router which has been used at a time of relaying the first port number examination request message to the server. The second port number examination response message contains the IP address of the router and a source port number of the router which has been used at a time of relaying the second port number examination request message to the server. When a predetermined port number of the communication terminal, which has been used at a time of transmitting the first port number examination request message, coincides with the source port number of the router which is contained in the first port number examination response message, the relay characteristic determination section determines that the relay characteristic of the router is to have a Port Reuse characteristic.

When the source port number of the router, which is contained in the first port number examination response message, coincides with the source port number of the router which is contained in the second port number examination response message, the relay characteristic determination section determines that the relay characteristic of the router is to have a Cone-type NAT function. Also, when the source port number of the router, which is contained in the first port number examination response message, does not coincide with the source port number of the router which is contained in the second port number examination response message, the relay characteristic determination section determines that the relay characteristic of the router is to have a Symmetric NAT function.

When the relay characteristic determination section determines that the relay characteristic of the router is not Port Reuse and the router has the Cone-type NAT function, the communication port determination section uses the source port number of the router, which is contained in the first port number examination response message, as a port number to be used for the one-to-one interconnection with the communication terminal on said another network.

When the relay characteristic determination section determines that the relay characteristic of the router is not Port Reuse and the router has the Symmetric NAT function, the communication port determination section uses, as a port number to be used for the one-to-one interconnection with the communication terminal on said another network, a port number which is a result of adding, to the source port number of the router which is contained in the second port number examination response message, a difference between the source port number of the router which is contained in the second port number examination response message and the source port number of the router which is contained in the first port number examination response message.

More particularly, the address information exchange section includes a relay information transmission section and relay information reception section. The relay information transmission section transmits, via the server to the communication terminal on said another network, a message in which the address information about the router is set, which address information is to be used for the one-to-one interconnection with the communication terminal on said another network. The relay information reception section receives a message from the communication terminal on said another network via the server, in which message address information, which the communication terminal on said another network uses for the one-to-one interconnection with the communication terminal, is set.

Preferably, the communication control section transmits, via the communication section to the address information exchanged by the address information exchange section, a message requesting a start of a one-to-one interconnection, and upon receiving a message requesting a start of a one-to-one interconnection from the communication terminal on said another network, performs the one-to-one interconnection with the communication terminal on said another network.

The present invention is also directed to a communication method performed by a communication terminal which is present on a private network connected to a global network via a router and which performs a one-to-one interconnection with a communication terminal on another network via the router. In order to achieve the above object, in the communication method of the present invention, the communication terminal: examines a relay characteristic of the router by transmitting and receiving a predetermined message to and from a server which is on the global network; when the relay characteristic of the router is Port Reuse, determines address information, which contains at least a port number to be used for the one-to-one interconnection with the communication terminal on said another network, to be the address information about the router; exchanges, with the communication terminal on said another network, the determined address information about the router; and performs the one-to-one interconnection with the communication terminal on said another network in accordance with the exchanged address information.

Effect of the Invention

As described above, according to the communication terminal and communication method of the present invention: predetermined messages are transmitted to and received from the server; the relay characteristic of the router is examined based on the transmitted and received messages; and when the relay characteristic of the router is Port Reuse, address information containing at least the port number of the communication terminal, which port number is to be used for the P2P communication with another communication terminal, is determined to be address information about the router. Consequently, in the case where the relay characteristic of the router is Port Reuse, the communication terminal and communication method of the present invention are able to simplify a process for determining, using the server, address information to be used by the router.

Further, when the relay characteristic of the router is Port Reuse and also Symmetric NAT, the communication terminal and communication method of the present invention are able to omit a process for predicting a port number to be used by the router. Therefore, the communication terminal and communication method of the present invention are capable of establishing, in a short period of time and with a small amount of traffic, a P2P communication path with another communication terminal, and realizing a high connectivity thereof.

BRIEF DESCRIPTION OF THE DRAWINGS

FIG. 3B is a block diagram showing an exemplary configuration of a communication terminal 20.

FIG. 8 illustrates types of NAT.

DESCRIPTION OF THE REFERENCE CHARACTERS

Figure 1:
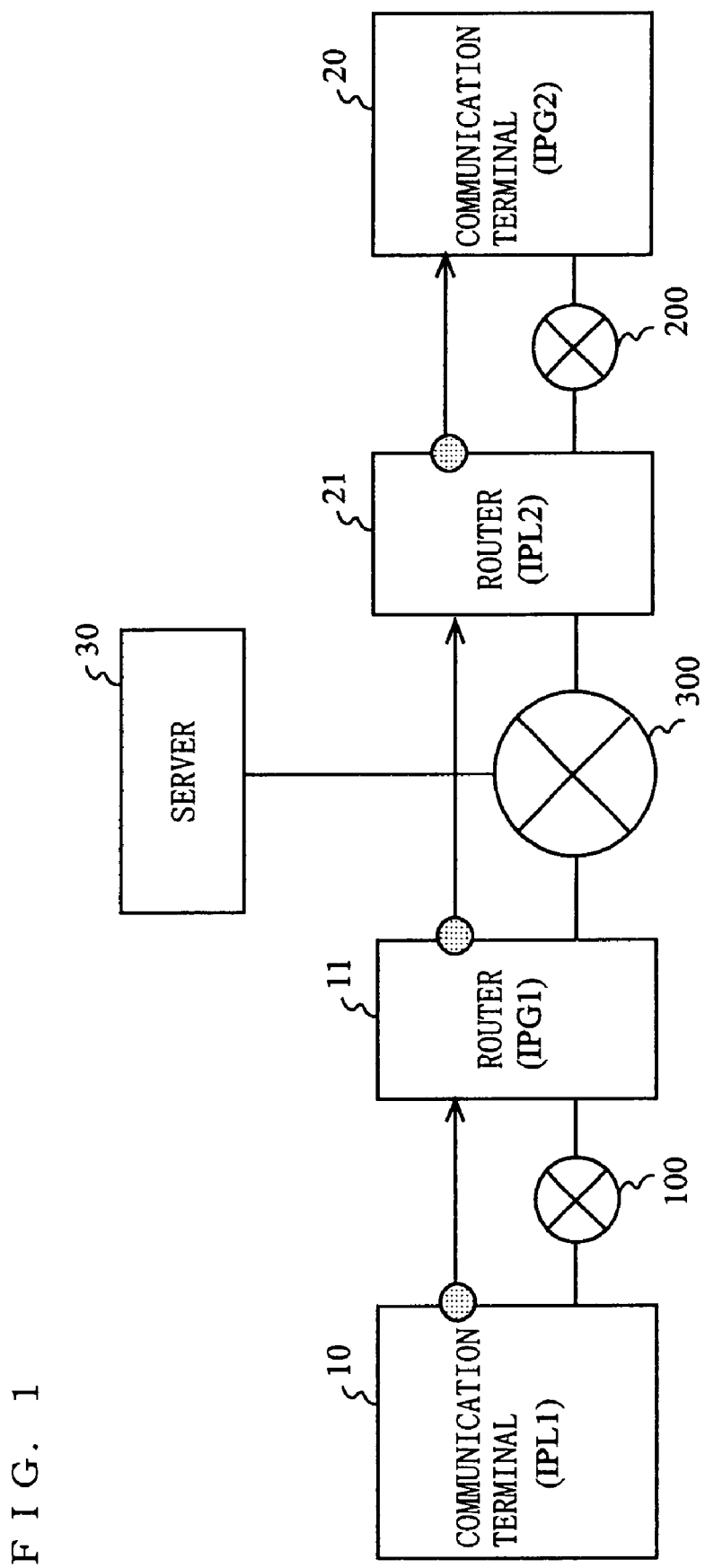
FIG. 1 shows an exemplary network configuration of a communication system according to an embodiment of the present invention.

10, 20 communication terminals (home terminals)
11, 21 routers
30 server
100, 200 private networks
300 global network
101, 201 address information examination request sections
102, 202 address information reception sections
103, 203 communication port determination sections
104, 204 relay characteristic determination sections
105, 205 relay information transmission sections
106, 206 relay information reception sections
301 address information examination section
302 address information transmission section
303 relay information transfer section
304 communication section

BEST MODE FOR CARRYING OUT THE INVENTION

Hereinafter, an embodiment of the present invention will be described with reference to the drawings.

FIG. 1 shows an exemplary network configuration of a communication system according to the embodiment of the present invention. In FIG. 1, a global network 300 and a private network 100 are connected via a router 11 having a global IP address [IPG1]. Also, the global network 300 and a private network 200 are connected via a router 21 having a global IP address [IPG2]. A sever 30 is connected to the global network 300. A communication terminal (home terminal) 10 having a private IP address [IPL1] is connected to the private network 100. A communication terminal (home terminal) 20 having a private IP address [IPL2] is connected to the private network 200.

Figure 2:
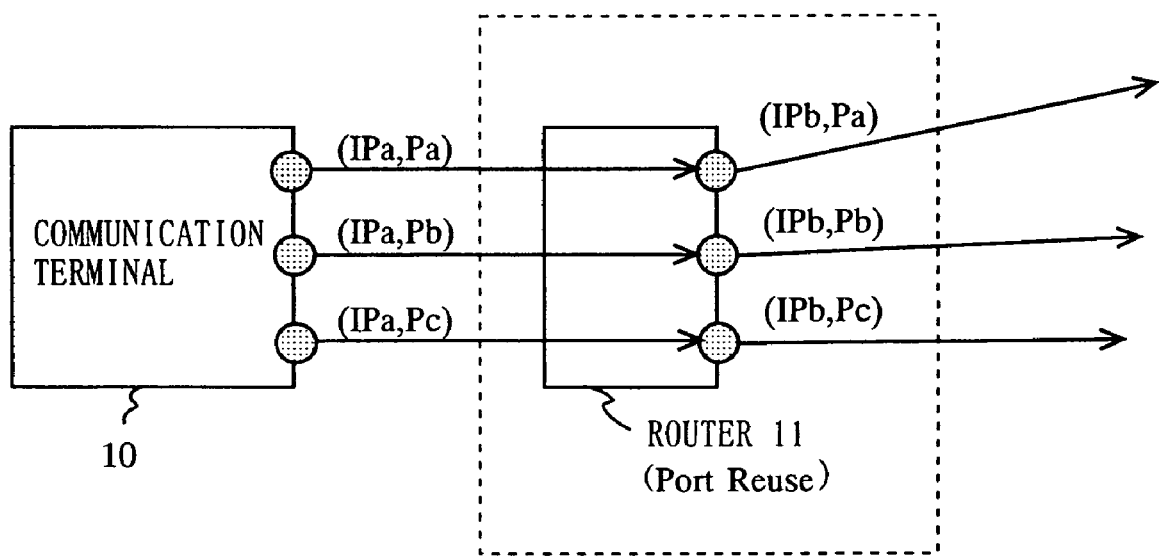
FIG. 2 illustrates a router 11 having a Port Reuse characteristic.

The router 11 is a Symmetric NAT router having a Port Reuse characteristic. Here, the router 11 having the Port Reuse characteristic is described with reference to FIG. 2. As shown in FIG. 2, when relaying a packet transmitted from the communication terminal 10, the router 11 having the Port Reuse characteristic allocates a port number, which is the same as a source port number of the packet to be relayed, as a source port number of the router 11.

For example, when relaying a packet transmitted from a port number [Pa] of the communication terminal 10, the router 11 allocates a port number [Pa] of the router 11 as a source port number of the packet to be relayed. Also, when relaying a packet transmitted from a port number [Pb] of the communication terminal 10, the router 11 allocates a port number [Pb] of the router 11 as a source port number of the packet to be relayed. Further, when relaying a packet transmitted from a port number [Pc] of the communication terminal 10, the router 11 allocates a port number [Pc] of the router 11 as a source port number of the packet to be relayed. Here, the router 21 is, on the other hand, a Full Cone NAT router which does not have the Port Reuse characteristic.

Figure 3A:
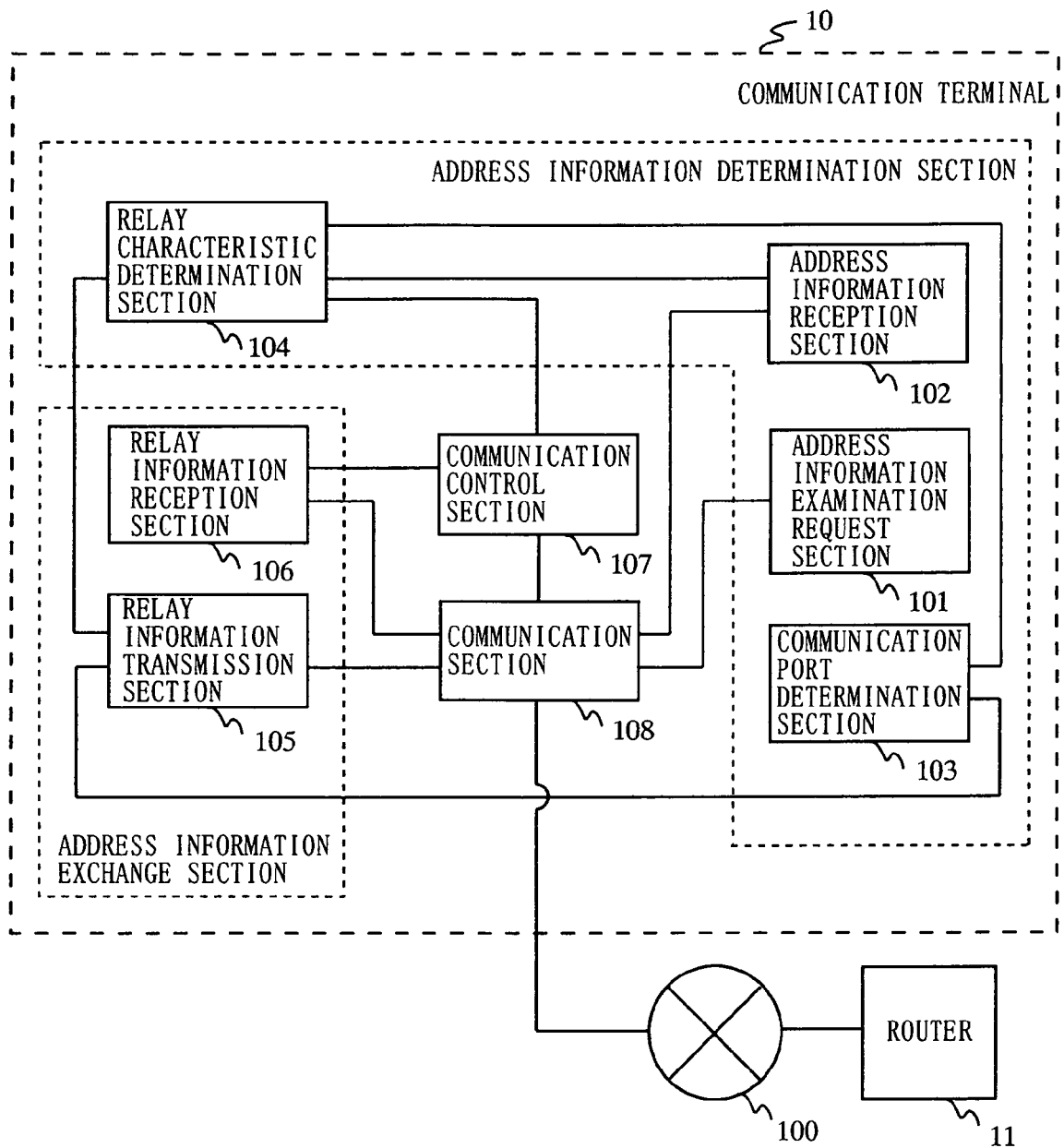
FIG. 3A is a block diagram showing an exemplary configuration of a communication terminal 10.

FIG. 3A is a block diagram showing an exemplary configuration of the communication terminal 10. In FIG. 3A, the communication terminal 10 comprises an address information examination request section 101, address information reception section 102, communication port determination section 103, relay characteristic determination section 104, relay information transmission section 105, relay information reception section 106, transmission control section 107 and a communication section 108.

The address information examination request section 101 transmits, to the sever 30, a message for examining a port number allocated to the router 11 to which the address information examination request section 101 is connected (port number examination request message). As a response to the port number examination request message, the address information reception section 102 receives, from the sever 30, a message containing the port number allocated to the router 11 (port number examination response message). Based on the received port number examination response message, the relay characteristic determination section 104 determines a relay characteristic of the router 11. Based on the relay characteristic of the router 11, the communication port determination section 103 determines a port number which the communication terminal 10 uses for P2P communication.

The relay information transmission section 105 transmits, to the sever 30, a message containing an IP address of the router 11 and the port number which the communication terminal 10 uses for P2P communication (IP/Port notification message). The relay information reception section 106 receives, from the sever 30, an IP/Port notification message transmitted from the communication terminal 20. The communication control section 107 controls the communication section 108 so as to perform P2P communication with the communication terminal 20. The communication section 108 performs all communications for the communication terminal 10.

Here, since the address information examination request section 101, address information reception section 102, communication port determination section 103 and the relay characteristic determination section 104 determine address information (i.e., IP address and port number) to be used for the P2P communication with the terminal 20, these sections may be collectively referred to as an address information determination section. Also, since the relay information transmission section 105 and relay information reception section 106 exchange the determined address information with the communication terminal 20, these sections may be collectively referred to as an address information exchange section.

FIG. 3B is a block diagram showing an exemplary configuration of the communication terminal 20. In FIG. 3B, the communication terminal 20 comprises an address information examination request section 201, address information reception section 202, communication port determination section 203, relay characteristic determination section 204, relay information transmission section 205, relay information reception section 206, communication control section 207 and a communication section 208. Since these component elements of the communication terminal 20 are the same as those of the above-described communication terminal 10, descriptions thereof will be omitted.

Figure 3C:
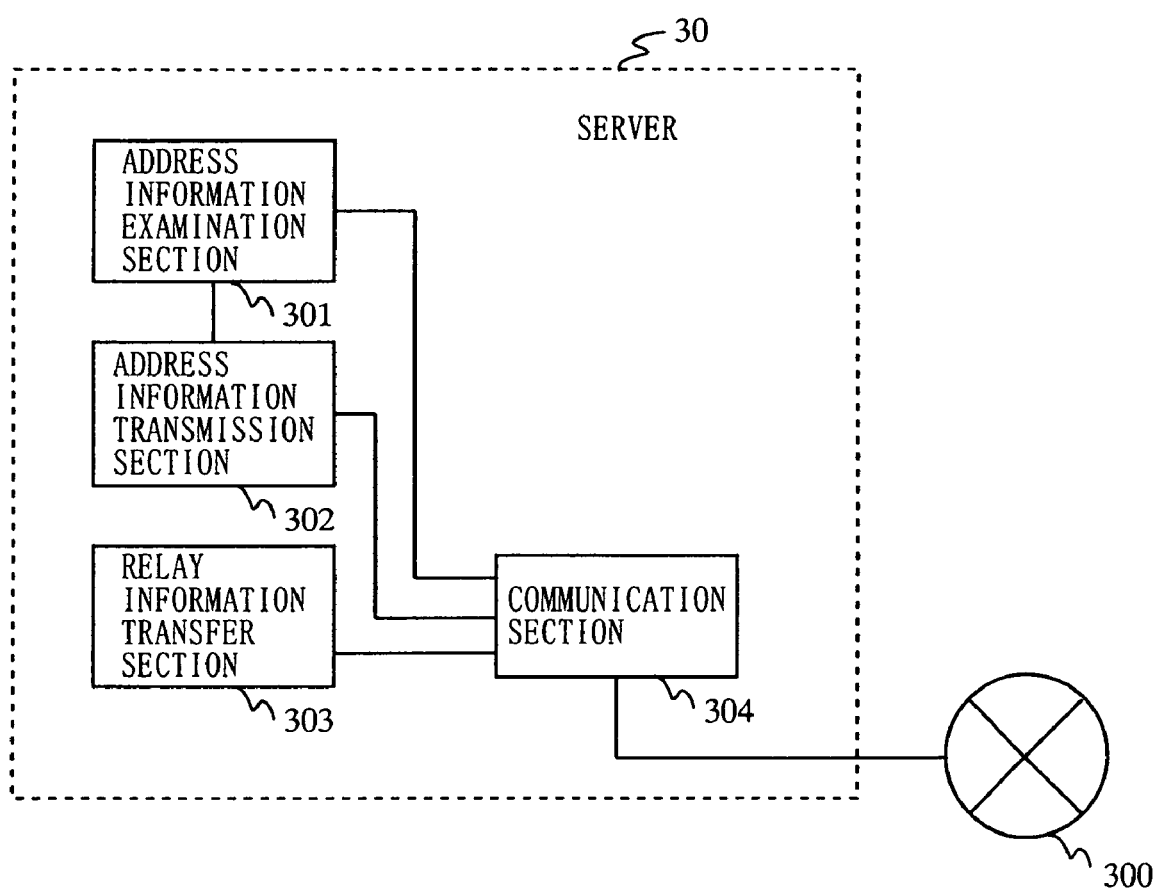
FIG. 3C is a block diagram showing an exemplary configuration of a sever 30.

FIG. 3C is a block diagram showing an exemplary configuration of the sever 30. In FIG. 3C, the sever 30 comprises an address information examination section 301, address information transmission section 302, relay information transfer section 303 and a communication section 304.

Upon receiving the port number examination request message from the communication terminal 10 or 20, the address information examination section 301 extracts a source IP address and source port number from the received message (from a header of a received packet). The address information transmission section 302 returns, to the communication terminal 10 or 20, a message containing the IP address and source port number which are extracted by the address information examination section 301 (port number examination response message). The relay information transfer section 303 relays the IP/Port notification message received from one of the communication terminals to the other of the communication terminals. The communication section 304 performs all communications for the sever 30.

Figure 4:
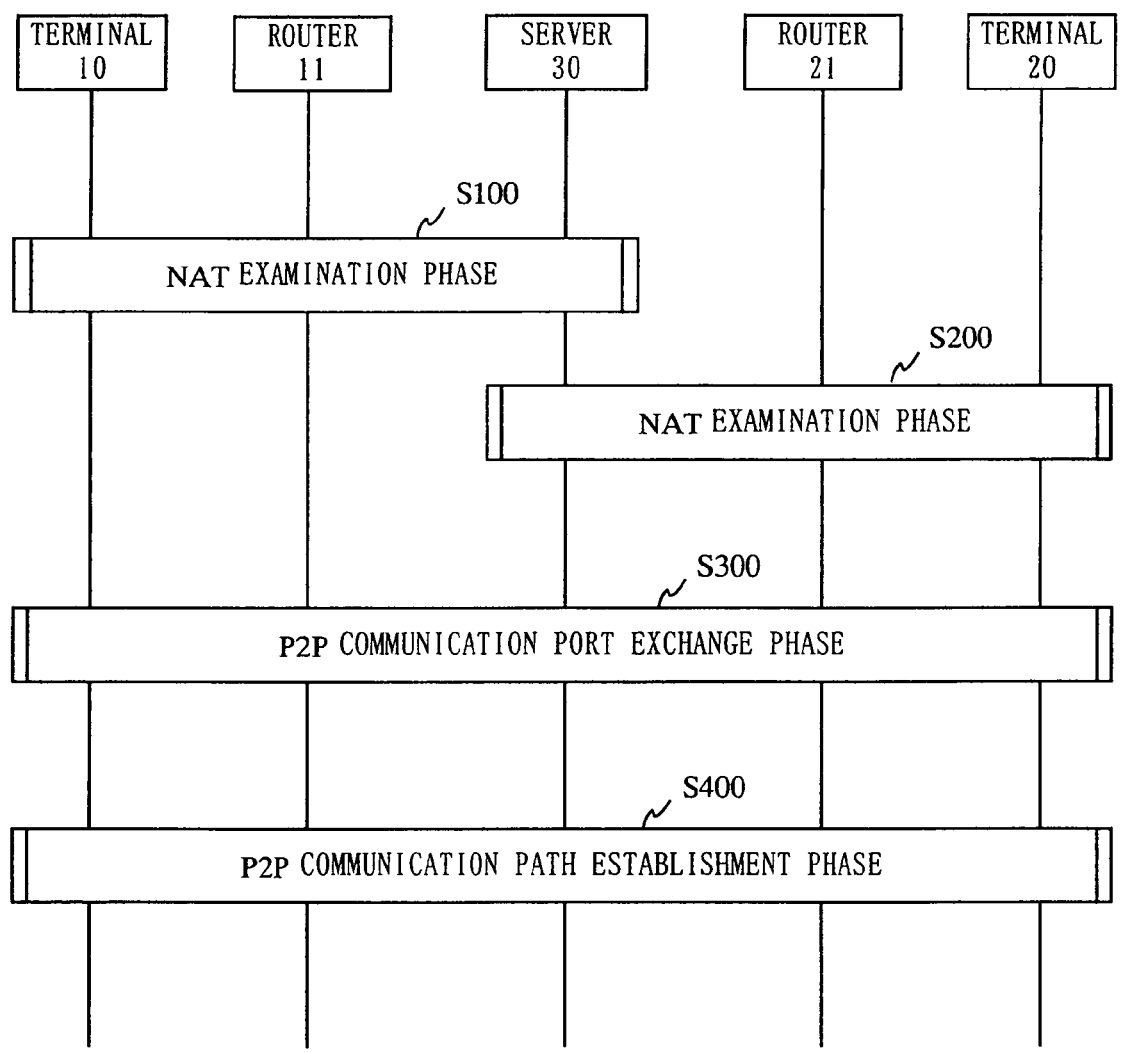
FIG. 4 illustrates operations which are performed in the communication system according to the embodiment of the present invention when a P2P communication path is established.

FIG. 4 illustrates operations, which are performed by the communication system according to the embodiment of the present invention at the time of establishing a P2P communication path. As shown in FIG. 4, at the time of establishing a P2P communication path, the communication system according to the embodiment of the present invention performs a NAT examination phase (steps S100 and S200), a P2P communication port exchange phase (step S300) and a P2P communication path establishment phase (step S400).

In the NAT examination phase (steps S100 and S200), each of the communication terminals 10 and 20 communicates with the sever 30 to examine the relay characteristic of the router 11 or 21 to which said each of the communication terminals 10 and 20 is connected, thereby determining a communication port which said each of the communication terminals 10 and 20 is able to access for P2P communication. To be specific, the communication terminals 10 and 20 each examine the relay characteristic of the router 11 or 21 to determine an NAT type of the router (e.g., Full Cone NAT, Symmetric NAT or the like) and whether the router has the Port Reuse characteristic.

In the P2P communication port exchange phase (step S300), the communication terminals 10 and 20 exchange with each other, via the sever 30, the communication ports determined in the NAT examination phase. In the P2P communication path establishment phase (step S400), the communication terminals 10 and 20 each transmit a packet to the communication port exchanged in the P2P communication port exchange phase, thereby establishing a P2P communication path.

Figure 5A:
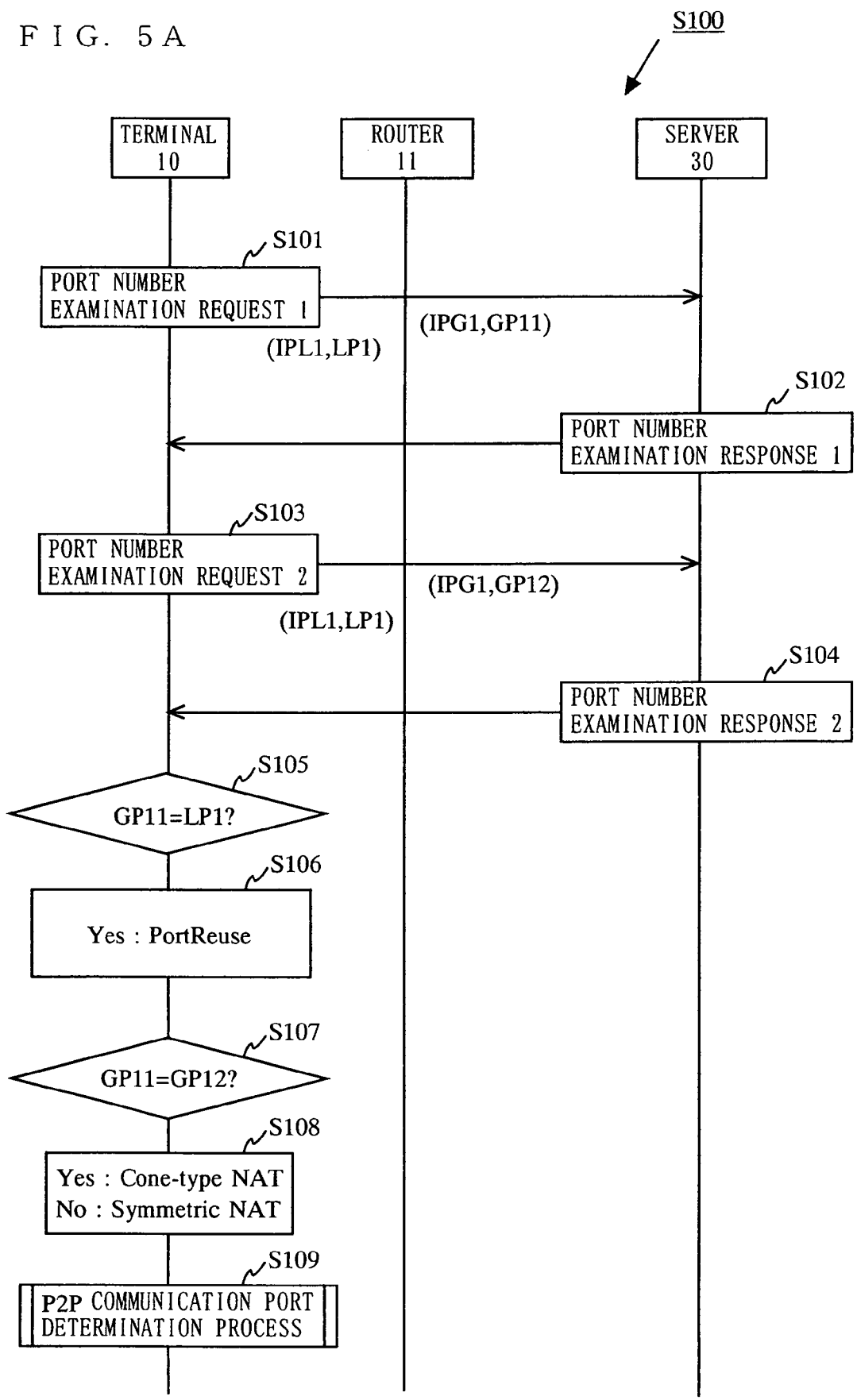
FIG. 5A is a flowchart showing in detail operations performed by the communication terminal 10 in a NAT examination phase (step S100).

FIG. 5A is a flowchart showing in detail operations performed by the communication terminal 10 in the NAT examination phase (step S100). Hereinafter, the NAT examination phase (step S100) will be described for the communication terminal 10 with reference to FIG. 5A. In FIG. 5A, a note such as (IPG1, GP11) provided below each message shows source address information (source IP address and source port number) contained in said each message.

First, in the communication terminal 10, the address information examination request section 101 transmits a port number examination request message 1 from a port number [LP1] of the communication terminal 10 to a port number [SP0] of the sever 30 (step S101).

In the sever 30, when the address information examination section 301 receives the port number examination request message 1 via the communication section 304, the address information examination section 301 extracts, from the received message (from a header of a received packet), a source IP address and source port number (i.e., the IP address [IPG1] and a source port number [GP11] of the router 11). Then, the address information transmission section 302 returns, to the communication terminal 10, a port number examination response message 1 containing the extracted IP address [IPG1] and source port number [GP11] of the router 11 (step S102).

Subsequently, in the communication terminal 10, the address information examination request section 101 transmits a port number examination request message 2 from the port number [LP1] of the communication terminal 10 to a port number [SP1] of the sever 30 (step S103).

In the sever 30, when the address information examination section 301 receives the port number examination request message 2 via the communication section 304, the address information examination section 301 extracts, from the received message (from a header of a received packet), a source IP address and source port number (i.e., the IP address [IPG1] and a source port number [GP12] of the router 11). Then, the address information transmission section 302 returns, to the communication terminal 10, a port number examination response message 2 containing the IP address [IPG1] and source port number [GP12] of the router 11 extracted by the address information examination section 301 (step S104).

Described below is a reason for the communication terminal 10 to transmit, at steps 101 and 103, the port number examination request messages to two port numbers [SP0, SP1] of the sever 30 from the same port number [LP1]. When the source port numbers of the router 11 contained in the two port number examination request messages received by the sever 30 are the same (i.e., GP11=GP12), the communication terminal 10 determines the router 11 to be a Cone-type NAT router (Full Cone, Restricted Cone or Port Restricted Cone). When the source port numbers contained in the two port number examination request messages received by the sever 30 are different (i.e., GP11≠GP12), the communication terminal 10 determines the router 11 to be a Symmetric NAT router. In other words, by transmitting the port number examination request messages to the two port numbers [SP0, SP1] of the server 30 from the same port number [LP1], the communication terminal 10 is able to examine the NAT type of the router 11.

Note that, the communication terminal 10 may examine the NAT type of the router 11 in a different manner from the above-described one. For example, the communication terminal 10 may transmit packets via the router to two servers having different IP addresses from each other. Then, the communication terminal 10 may examine the NAT type of the router based on whether port numbers of the router which are allocated at this point are the same or different.

In the communication terminal 10, when the address information reception section 102 receives the port number examination response messages 1 and 2 via the communication section 108, the address information reception section 102 gives the received messages to the relay characteristic determination section 104. The relay characteristic determination section 104 checks whether the port number [GP11] of the router 11, which is contained in the port number examination response message 1, coincides with the port number [LP1] of the communication terminal 10 which has been used at the time of transmission of the port number examination request message 1 (step S105). When the port number [GP11] of the router 11 coincides with the port number [LP1] of the communication terminal 10 (i.e., GP11=LP1), the relay characteristic determination section 104 determines the NAT of the router 11 to have the Port Reuse characteristic (step S106).

In the communication terminal 10, the relay characteristic determination section 104 further checks whether the port numbers of the router 11, which are contained in the port number examination response messages 1 and 2 received by the address information reception section 102, coincide with each other (step S107). When the port numbers of the router 11 coincide with each other, the relay characteristic determination section 104 determines the router 11 to be a Cone-type NAT router. When the port numbers of the router 11 do not coincide with each other, the relay characteristic determination section 104 determines the router 11 to be a Symmetric NAT router (step S108).

Based on the relay characteristic of the router 11 determined by the relay characteristic determination section 104, the communication port determination section 103 determines a port number which the communication terminal 10 uses for P2P communication (step S109). A P2P communication port determination process (step S109) will be described later in detail.

Figure 5B:
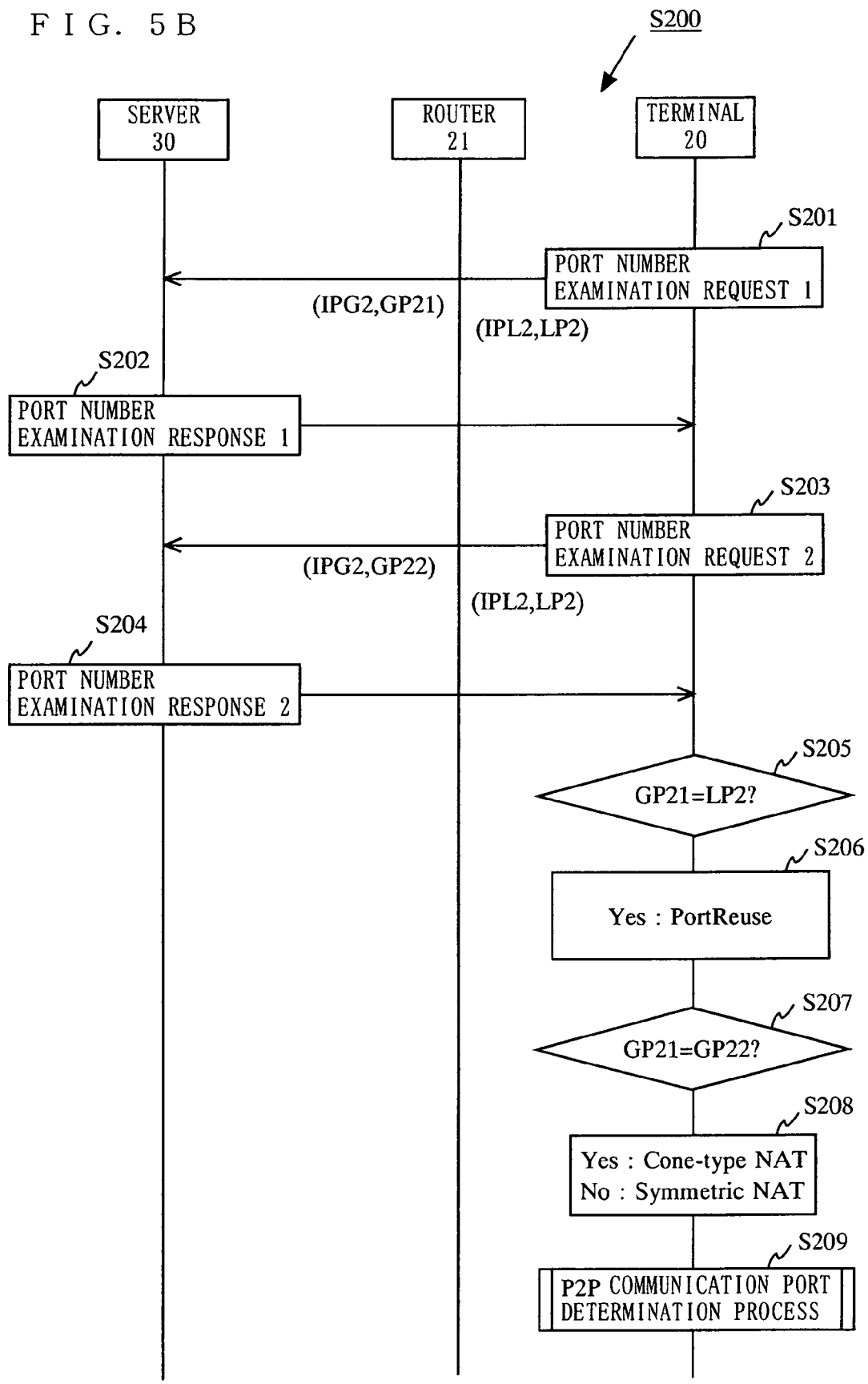
FIG. 5B is a flowchart showing in detail operations performed by the communication terminal 20 in the NAT examination phase (step S200).

FIG. 5B is a flowchart showing in detail operations performed by the communication terminal 20 in the NAT examination phase (step S200). Hereinafter, the NAT examination phase process (step S200) will be described for the communication terminal 20 with reference to FIG. 5B.

First, in the communication terminal 20, the address information examination request section 201 transmits a port number examination request message 1 from a port number [LP2] of the communication terminal 20 to the port number [SP0] of the sever 30 (step S201).

In the sever 30, when the address information examination section 301 receives the port number examination request message 1 via the communication section 304, the address information examination section 301 extracts, from the received message (from a header of a received packet), a source IP address and source port number (i.e., the IP address [IPG2] and a source port number [GP21] of the router 21). Then, the address information transmission section 302 returns, to the communication terminal 20, a port number examination response message 1 containing the IP address [IPG2] and source port number [GP21] of the router 21 extracted by the address information examination section 301 (step S202).

In the communication terminal 20, the address information examination request section 201 transmits a port number examination request message 2 from the port number [LP2] of the communication terminal 20 to the port number [SP1] of the sever 30 (step S203).

In the sever 30, when the address information examination section 301 receives the port number examination request message 2 via the communication section 304, the address information examination section 301 extracts, from the received message (from a header of a received packet), a source IP address and source port number (i.e., the IP address [IPG2] and a source port number [GP22] of the router 21). Then, the address information transmission section 302 returns, to the communication terminal 20, a port number examination response message 2 containing the IP address [IPG2] and source port number [GP22] of the router 21 extracted by the address information examination section 301 (step S204).

Here, a reason for the communication terminal 20 to transmit, at steps 201 and 203, the port number examination request messages to the two port numbers [SP0, SP1] of the sever 30 from the same port number [LP2] is the same as that described above for the communication terminal 10 with reference to FIG. 5A.

Next, in the communication terminal 20, when the address information reception section 202 receives the port number examination response messages 1 and 2 via the communication section 208, the address information reception section 202 gives the received message to the relay characteristic determination section 204. The relay characteristic determination section 204 checks whether the port number [GP21] of the router 21, which is contained in the port number examination response message 1, coincides with the port number [LP2] of the communication terminal 20 which has been used at the time of transmission of the port number examination request message 1 (step S205). When the port number [GP21] of the router 21 coincides with the port number [LP2] of the communication terminal 20 (i.e., GP1=LP2), the relay characteristic determination section 204 determines the NAT of the router 21 to have the Port Reuse characteristic (step S206).

Further, in the communication terminal 20, the relay characteristic determination section 204 checks whether the port numbers of the router 21, which are contained in the port number examination response messages 1 and 2 received by the address information reception section 202, coincide with each other (step S207). When the port numbers of the router 21 coincide with each other, the relay characteristic determination section 204 determines the router 21 to be a Cone-type NAT router. When the port numbers of the router 21 do not coincide with each other, the relay characteristic determination section 204 determines the router 21 to be a Symmetric NAT router (step S208).

Based on the relay characteristic of the router 21 determined by the relay characteristic determination section 204, the communication port determination section 203 determines a port number which the communication terminal 20 uses for P2P communication (step S209).

Figure 5C:
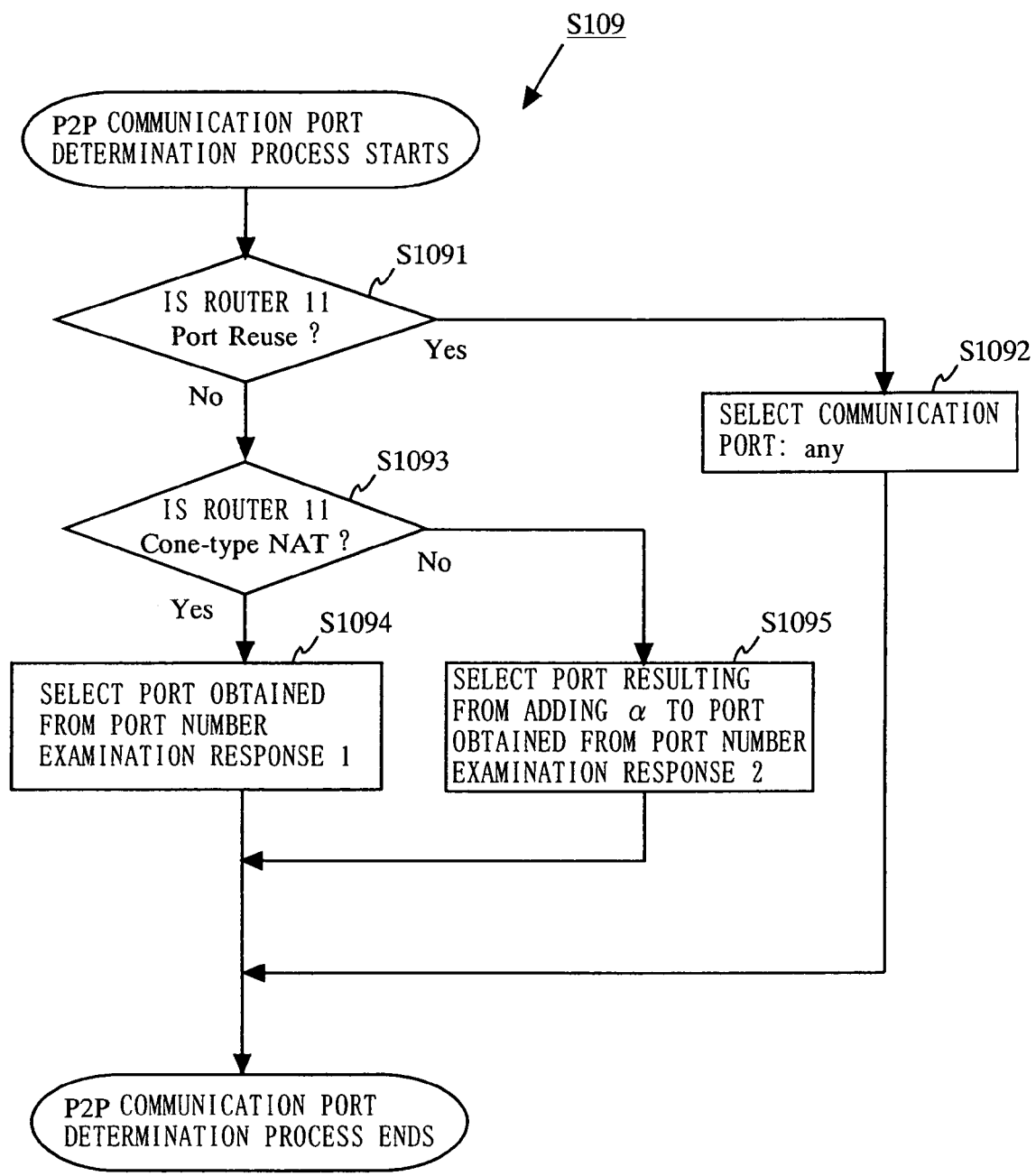
FIG. 5C is a flowchart showing in detail operations performed in a P2P communication port determination process (step S109).

FIG. 5C is a flowchart showing in detail operations performed in the P2P communication port determination process (step S109) of FIG. 5A. Hereinafter, the P2P communication port determination process (step S109) performed by the communication terminal 10 will be described in detail with reference to FIG. 5C.

First, in the communication terminal 10, the communication port determination section 103 checks whether the NAT of the router 11 has the Port Reuse characteristic (step S1091). When the NAT of the router 11 has the Port Reuse characteristic, the communication port determination section 103 freely selects a port number to be used for P2P communication (step S1092). It is assumed here that the communication port determination section 103 selects a port number [GP13] as the port number to be used for the P2P communication.

Described below is a reason for the communication port determination section 103 to be allowed to freely select, when the NAT of the router 11 has the Port Reuse characteristic, the port number to be used for the P2P communication. When the router 11 has the Port Reuse characteristic, the router 11 is allocated with a same port number as that opened by the communication terminal 10. For this reason, the communication terminal 10 is, in the following P2P communication port exchange phase (step S300), only required to notify the communication terminal 20 of the port number which the communication terminal 10 has opened. Thus, the communication port determination section 103 is allowed to freely select the port number to be used for the P2P communication.

When the NAT of the router 11 does not have the Port Reuse characteristic, the communication port determination section 103 checks whether the router 11 is a Cone-type NAT router (step S1093). When the NAT of the router 11 is a Cone-type NAT router, the communication port determination section 103 selects the port number of the router 11, which has been obtained from the port number examination response message 1 (step S102), as the port number to be used for the P2P communication (step S1094), because, in the case where the router 11 is a Cone-type NAT router, the router 11 is always allocated with a same port number when messages, which the router 11 relay, have a same source port number.

On the other hand, when the router 11 is not a Cone-type NAT router (i.e., when the router 11 is a Symmetric NAT router), the communication port determination section 103 is required to predict a port number which is allocated to the router 11 when P2P communication is performed. For this reason, when it is assumed that a difference between the port number [GP12] of the router 11, which is obtained from the port number examination response message 2, and the port number [GP11] of the router 11, which is obtained from the port number examination response message 1, is $\alpha$, the communication port determination section 103 selects [GP12+$\alpha$] as the port number to be used for the P2P communication (step S1095).

Note that, since the P2P communication port determination process (step S209) in FIG. 5B is the same as that of FIG. 5C, a description thereof will be omitted.

It is assumed in the present embodiment that the router 11 has the Port Reuse characteristic and is a Symmetric NAT router. For this reason, the port numbers which the router 11 allocates are GP11=LP1 and GP11≠GP12. It is also assumed in the present embodiment that the router 21 does not have the Port Reuse characteristic and is a Full Cone NAT router. For this reason, the port numbers which the router 21 allocates are GP21*LP2 and GP21=GP22. Hereinafter, descriptions will be given assuming that the routers 11 and 21 allocate the above port numbers.

Figure 6:
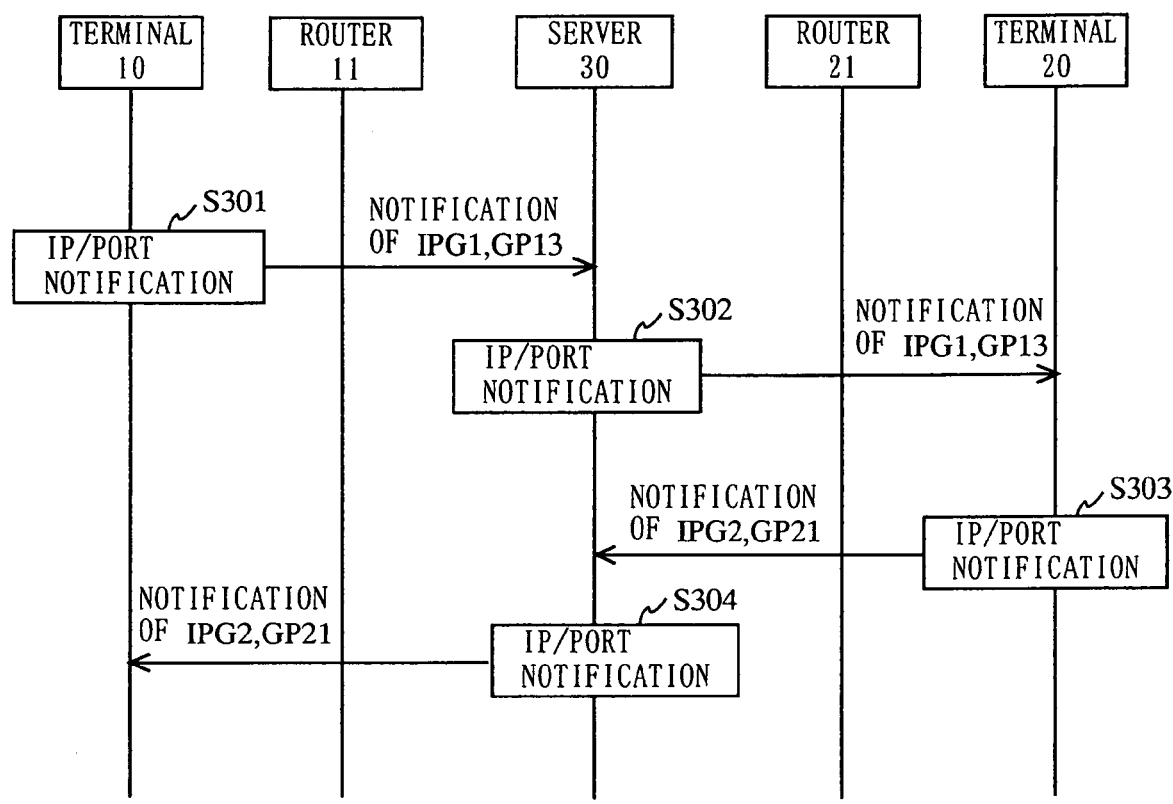
FIG. 6 is a flowchart showing in detail a P2P communication port exchange phase (step S300).

FIG. 6 is a flowchart showing in detail operations performed in the P2P communication port exchange phase (step S300) of FIG. 4. Hereinafter, the P2P communication port exchange phase (step S300) will be described in detail with reference to FIG. 6.

In the communication terminal 10, the relay information transmission section 105 transmits, to the sever 30, the IP address of the router 11 and the IP/Port notification message containing the port number determined by the communication port determination section 103 (step S301). Sine the router 11 has the Port Reuse characteristic in the present embodiment, the IP/Port notification message received by the sever 30 contains the IP address [IPG1] and port number [GP13] of the router 11.

In the sever 30, the relay information transfer section 303 relays the IP/Port notification message, which has been received from the communication terminal 10, to the communication terminal 20 via the communication section 304 (step S302). In the communication terminal 20, the relay information reception section 206 receives, via the sever 30, the IP/Port notification message transmitted from the communication terminal 10.

In the communication terminal 20, the relay information transmission section 205 transmits the port number, which has been determined by the communication port determination section 203, to the sever 30 as the IP/Port notification message (step S303). Since the router 21 is a Full Cone NAT router and does not have the Port Reuse characteristic in the present embodiment, the IP/Port notification message contains the IP address [IPG2] and port number [GP21] of the router 21 obtained from the port number examination response message 1.

In the sever 30, the relay information transfer section 303 relays the IP/Port notification message, which has been received from the communication terminal 20, to the communication terminal 10 via the communication section 304 (step S304). In the communication terminal 10, the relay information reception section 206 receives, via the sever 30, the IP/Port notification message transmitted from the communication terminal 20.

Figure 7:
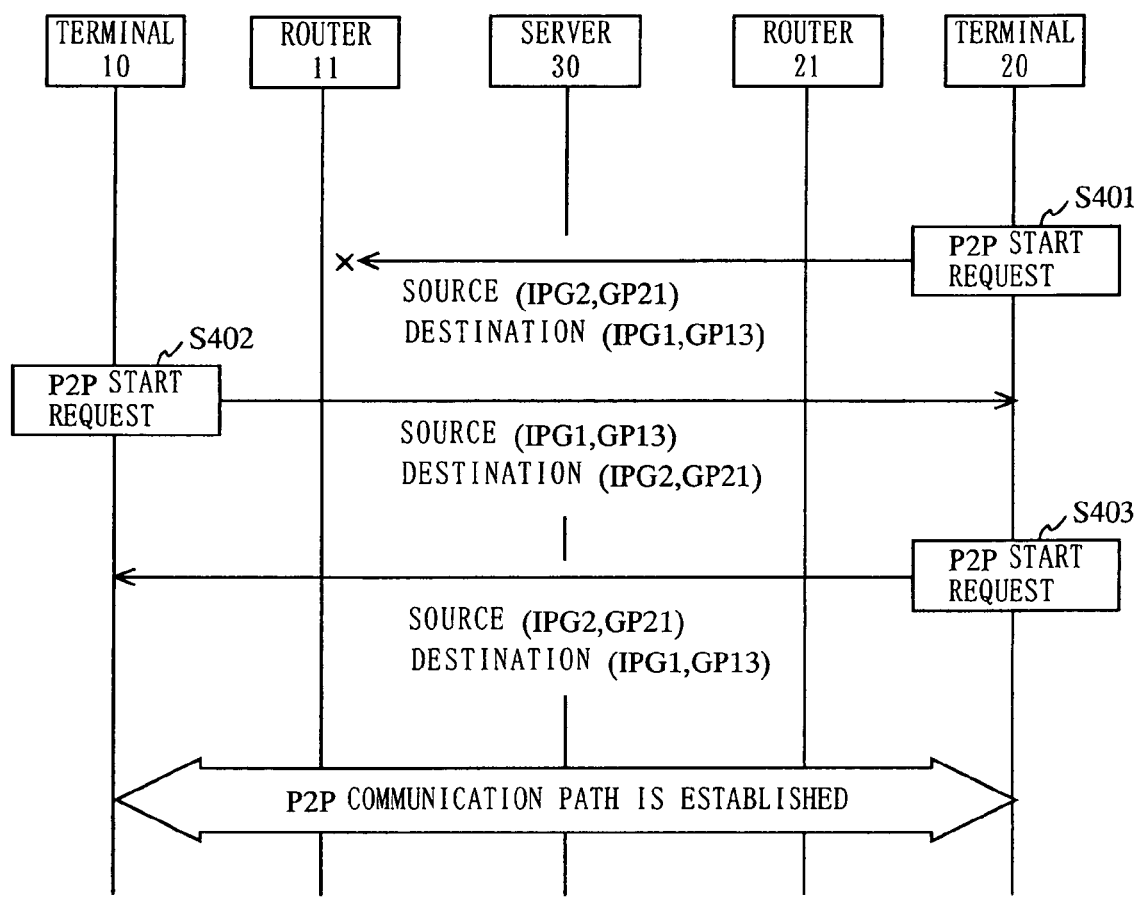
FIG. 7 is a flowchart showing in detail a P2P communication path establishment phase (step S400).
Figure 9:
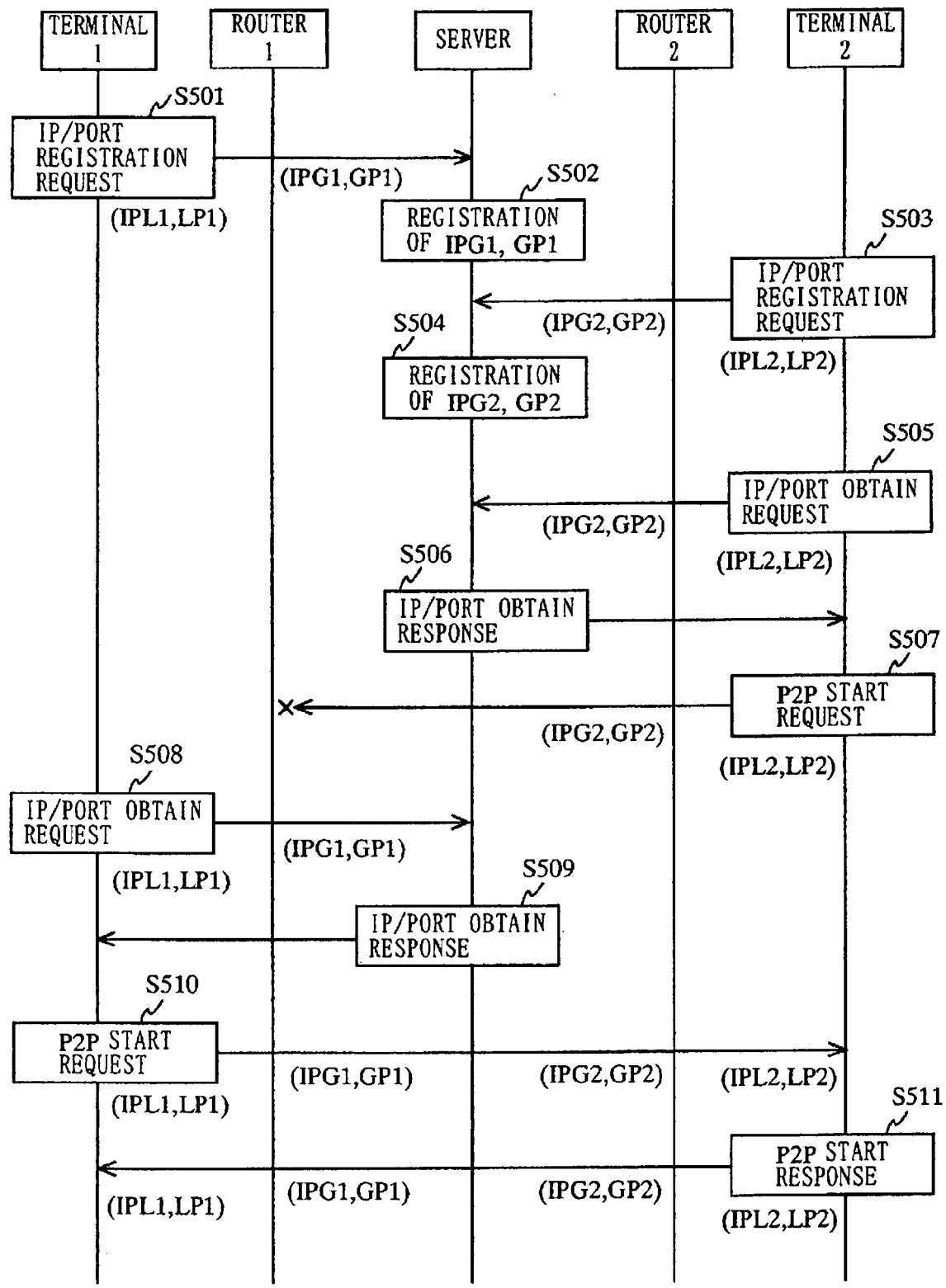
FIG. 9 shows a sequence of operations which are performed between terminals in order to realize P2P communication by using a method in which STUN is used.
Figure 10:
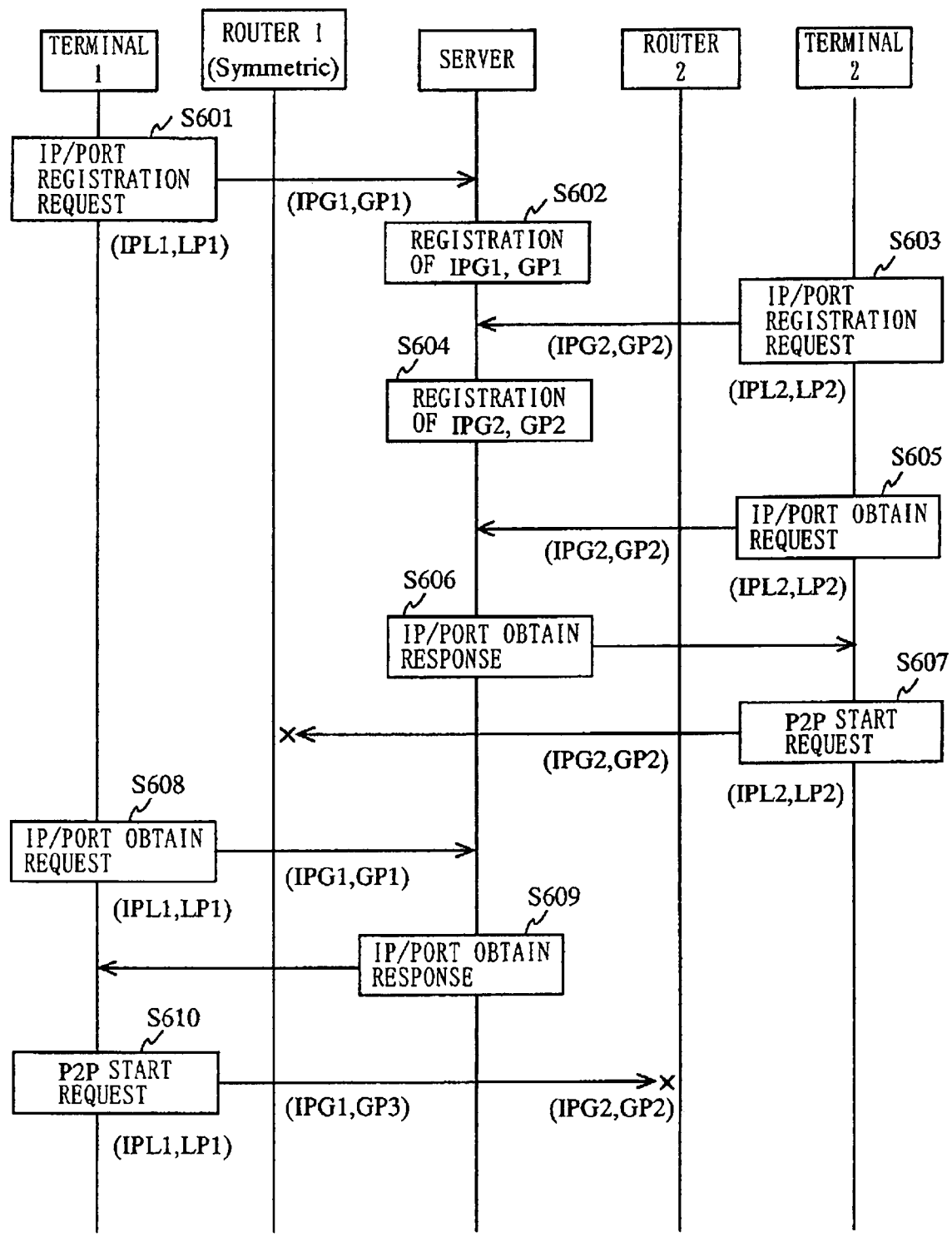
FIG. 10 illustrates a problem which occurs when a router 1 is a Symmetric NAT router.
Figure 11:
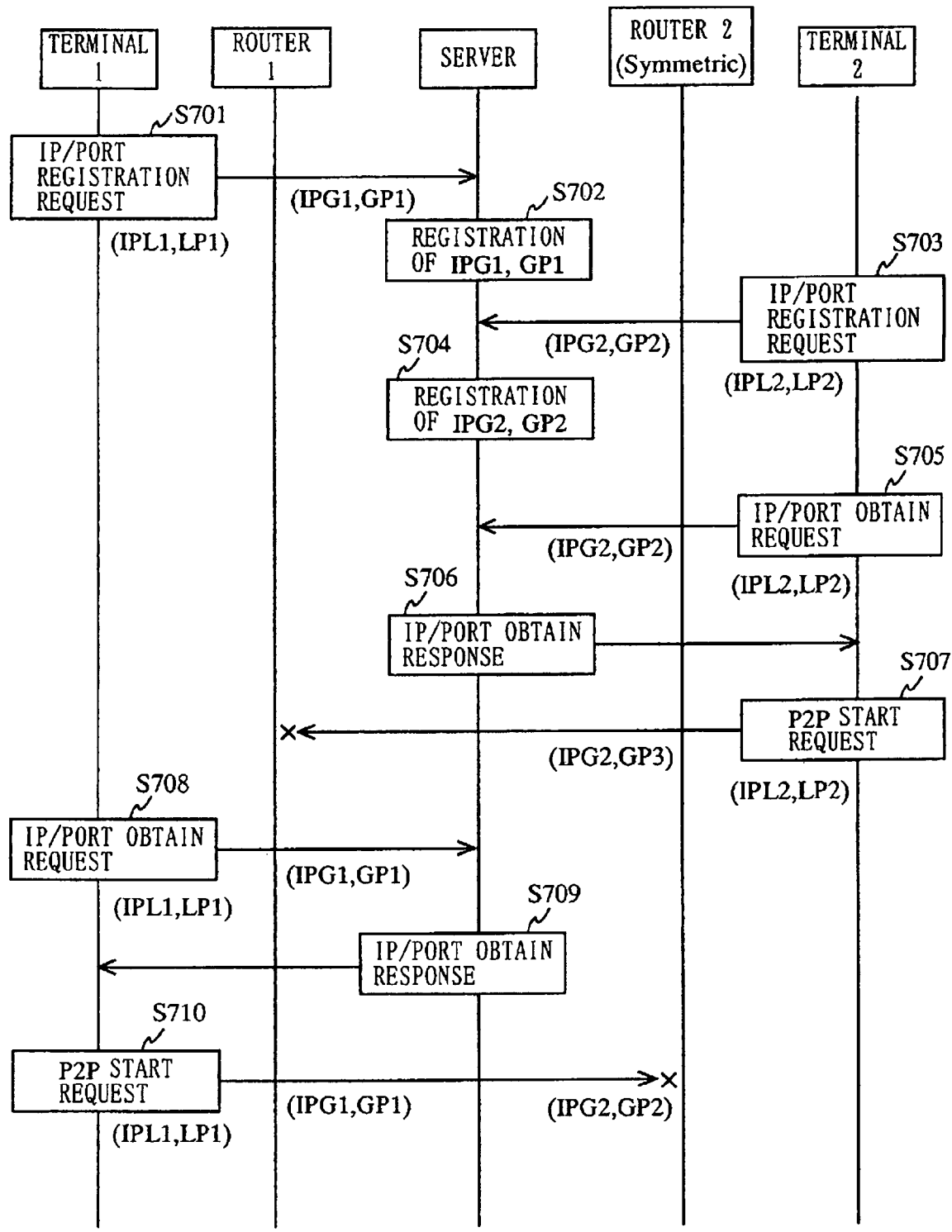
FIG. 11 illustrates a problem which occurs when a router 2 is a Symmetric NAT router.
Figure 12:
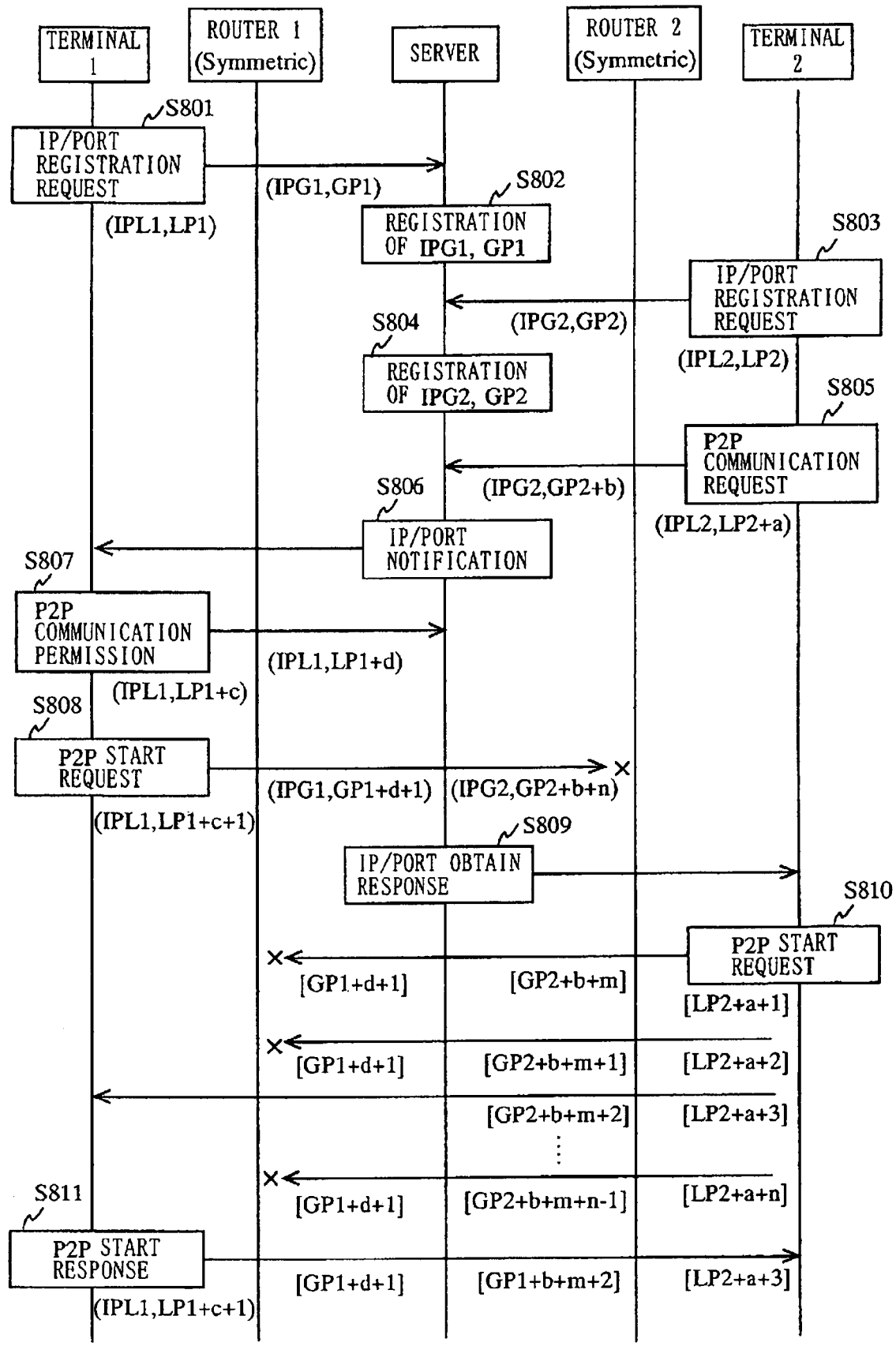
FIG. 12 is a sequence diagram showing a process for establishing a P2P communication path by using a conventional method disclosed in Patent Document 1.

FIG. 7 is a flowchart showing in detail operations performed in the P2P communication path establishment phase (step S400) of FIG. 4. Hereinafter, the P2P communication path establishment phase (step S400) will be described in detail with reference to FIG. 7.

In the communication terminal 20, the communication control section 207 transmits a P2P start request message to address information [IPG1, GP13] contained in the IP/Port notification message which has been received from the communication terminal 10 at step S302 (step S401). The P2P start request message transmitted from the communication terminal 20 is relayed by the router 21 to the router 11. At this point, as a setting for relaying a packet directed in the opposite direction, the NAT of the router 21 is set so as to relay a packet, which the router 21 [IPG2, GP21] receives from the communication terminal 10 (i.e., from the router 11 [IPG1, GP13]), to the communication terminal 20 [IPL2, LP2].

The P2P start request message transmitted from the communication terminal 20 is received by the router 11 via the router 21. However, the NAT of the router 11 has not been set so as to relay a packet, which has been transmitted via the router 21 [IPG2, GP21] to the address information [IPG1, GP13], to the communication terminal 10. Therefore, the P2P start request message transmitted from the communication terminal 20 is discarded by the router 11.

In the communication terminal 10, The communication control section 107 transmits a P2P start request message to address information [IPG2, GP21] contained in the IP/Port notification message received from the communication terminal 20 at step S304 (step S402). The P2P start request message transmitted from the communication terminal 10 is relayed by the router 11 to the router 21. At this point, as a setting for relaying a packet directed in the opposite direction, the NAT of the router 11 is set so as to relay a packet, which the router 11 [IPG1, GP13] receives from the communication terminal 20 (i.e., from the router 21 [IPG2, GP21]), to the communication terminal 10 [IPL1, LP1].

The P2P start request message transmitted from the communication terminal 10 is received by the router 21 via the router 11. As described above, the router 21 has been set so as to relay a packet, which the router 21 [IPG2, GP21] receives from a home terminal 11 (i.e., from the router 11 [IPG1, GP13]), to the communication terminal 20 [IPL2, LP2]. Therefore, the router 21 is able to relay, to the communication terminal 20, the P2P start request message transmitted from the communication terminal 10.

Further, in the communication terminal 20, when the communication control section 207 receives the P2P start request message from the communication terminal 10, the communication control section 207 again transmits the P2P start request message to the address information [IPG1, GP13] contained in the IP/Port notification message which has been received from the communication terminal 10 at step S302 (step S403). The P2P start request message transmitted from the communication terminal 20 is relayed by the router 21 to the router 11. As described above, the router 11 has been set so as to relay a packet, which the router 11 [IPG1, GP13] receives from the communication terminal 20 (i.e., from the router 21 [IPG2, GP21]), to the communication terminal 10 [IPL1, LP1]. Therefore, the router 11 is able to relay, to the communication terminal 10, the P2P start request message transmitted from the communication terminal 20. As a result, a P2P communication path is established between the communication terminals 10 and 20.

As described above, the communication terminal 10 according to the embodiment of the present invention transmits and receives predetermined messages to and from the sever 30, and based on the transmitted and received messages, examines the relay characteristic of the router 11. When the relay characteristic of the router 11 is Port Reuse, the communication terminal 10 determines address information, which contains at least the port number of the communication terminal 10 which the communication terminal 10 uses for P2P communication with the other communication terminal 20, to be address information to be used by the router. This allows the communication terminal 10 to simplify, when the relay characteristic of the router 11 is Port Reuse, a process for determining, using the server 30, the address information to be used by the router 11.

Further, the communication terminal 10 is capable of, when the router 11 has the Port Reuse relay characteristic and is a Symmetric NAT router, omitting a process for predicting the port number to be used by the router 11. Therefore, the communication terminal 10 is capable of establishing, in a short period of time and with a small amount of traffic, the P2P communication path with the other communication terminal 20, and realizing high connectivity thereof.

Note that, the NAT examination phase (steps S100 and S200) in FIG. 4 is required to be performed by each terminal in advance as a preparation for the following P2P communication port exchange phase (step S300). The NAT examination phase is not necessarily performed in the manner shown in FIG. 4.

In the case where terminals which have already performed P2P communication therebetween perform P2P communication therebetween again, the NAT examination phase may be omitted if a previously examined relay characteristic of the router is Port Reuse.

In FIG. 6, the communication terminal 10 first transmits the IP/Port notification message. However, depending on a timing of determining the P2P communication port shown in FIGS. 5A and 5b, the communication terminal 20 may first transmit the IP/Port notification message. Thus, the process is not necessarily performed in the order shown in FIG. 6.

Further, in FIG. 6, each of the communication terminals 10 and 20 uses the IP/Port notification message to notify a corresponding terminal of only one IP/Port combination. However, by notifying the corresponding terminal of a plurality of IP/Port combinations, probability for the P2P communication path to be successfully established may be increased.

In FIG. 7, the communication terminal 20 first transmits the P2P communication start request message. However, depending on a timing of receiving the IP/Port notification message shown in FIG. 6, the communication terminal 10 may first transmit the P2P communication start request message. Thus, the process is not necessarily performed in the order shown in FIG. 7.

INDUSTRIAL APPLICABILITY

The communication terminal and communication method of the present invention are useful when the communication terminal performs, via a router, a one-to-one interconnection with a communication terminal on another network.

The invention claimed is:

1. A communication terminal, which is present on a private network connected to a global network via a router and which performs a one-to-one interconnection with a communication terminal on another network via the router, comprising:
   an address information determination section for examining a relay characteristic of the router by transmitting and receiving a predetermined message to and from a server which is on the global network and for, based on an examination result, determining address information about the router, which address information is to be used for the one-to-one interconnection with the communication terminal on said another network;
   an address information exchange section for exchanging, with the communication terminal on said another network, the address information about the router which has been determined by the address information determination section;
   a communication control section for, based on the address information about the router which has been exchanged by the address information exchange section, performing the one-to-one interconnection with the communication terminal on said another network; and
   a communication section for performing all communications for the communication terminal, wherein
   when the relay characteristic of the router is Port Reuse, the address information determination section determines address information, which contains at least a port number of the communication terminal, which port number is to be used for the one-to-one interconnection with the communication terminal on said another network, to be the address information about the router.

2. The communication terminal according to claim 1, wherein the address information determination section includes:
   an address information examination request section for providing a request for the address information about the router by transmitting a predetermined message to the server via the router;
   an address information reception section for receiving, from the server, the address information about the router as a response to the request;
   a relay characteristic determination section for, based on the address information about the router which has been received by the address information reception section, determining the relay characteristic of the router; and
   a communication port determination section for, based on the relay characteristic of the router which has been determined by the relay characteristic determination section, determining a port number of the communication terminal, which port number is to be used for the one-to-one interconnection with the communication terminal on said another network.

3. The communication terminal according to claim 2, wherein
   the address information examination request section successively transmits, from a predetermined port number of the communication terminal, a first port number examination request message to a first port number of the server and a second port number examination request message to a second port number of the server,
   the address information reception section receives, from the server, a first port number examination response message which is a response to the first port number examination request message and a second port number examination response message which is a response to the second port number examination request message, and
   the relay characteristic determination section determines the relay characteristic of the router in accordance with the first and second port number examination response messages received by the address information reception section.

4. The communication terminal according to claim 3, wherein
   the first port number examination response message contains an IP address of the router and a source port number of the router which has been used at a time of relaying the first port number examination request message to the server,
   the second port number examination response message contains the IP address of the router and a source port number of the router which has been used at a time of relaying the second port number examination request message to the server, and
   the relay characteristic determination section determines the relay characteristic of the router to be Port Reuse when a port number of the communication terminal, which has been used at a time of transmitting the first port number examination request message, coincides with the source port number of the router which is contained in the first port number examination response message.

5. The communication terminal according to claim 4, wherein
   the relay characteristic determination section determines that:
     when the source port number of the router, which is contained in the first port number examination response message, coincides with the source port number of the router which is contained in the second port number examination response message, the relay characteristic of the router is to have a Cone-type NAT function; and
     when the source port number of the router, which is contained in the first port number examination response message, does not coincide with the source port number of the router which is contained in the second port number examination response message, the relay characteristic of the router is to have a Symmetric NAT function.

6. The communication terminal according to claim 5, wherein when the relay characteristic determination section determines that the relay characteristic of the router is not Port Reuse and the router has the Cone-type NAT function, the communication port determination section uses the source port number of the router, which is contained in the first port number examination response message, as a port number to be used for the one-to-one interconnection with the communication terminal on said another network.

7. The communication terminal according to claim 5, wherein when the relay characteristic determination section determines that the relay characteristic of the router is not Port Reuse and the router has the Symmetric NAT function, the communication port determination section uses, as a port number to be used for the one-to-one interconnection with the communication terminal on said another network, a port number which is a result of adding, to the source port number of the router which is contained in the second port number examination response message, a difference between the source port number of the router which is contained in the second port number examination response message and the source port number of the router which is contained in the first port number examination response message.

8. The communication terminal according to claim 1, wherein the address information exchange section includes a relay information transmission section for transmitting, via the server to the communication terminal on said another network, a message in which the address information about the router is set, which address information is to be used for the one-to-one interconnection with the communication terminal on said another network, and a relay information reception section for receiving a message from the communication terminal on said another network via the server, in which message address information, which the communication terminal on said another network uses for the one-to-one interconnection with the communication terminal, is set.

9. The communication terminal according to claim 1 wherein the communication control section transmits, via the communication section to the address information exchanged by the address information exchange section, a message requesting a start of a one-to-one interconnection, and upon receiving a message requesting a start of a one-to-one interconnection from the communication terminal on said another network, performs the one-to-one interconnection with the communication terminal on said another network.

10. A communication method performed by a communication terminal which is present on a private network connected to a global network via a router and which performs a one-to-one interconnection with a communication terminal on another network via the router, the communication method comprising:

examining a relay characteristic of the router by transmitting and receiving a predetermined message to and from a server which is on the global network;

when the relay characteristic of the router is Port Reuse, determining address information, which contains at least a port number of the communication terminal, which port number is to be used for the one-to-one interconnection with the communication terminal on said another network, to be the address information about the router;

exchanging, with the communication terminal on said another network, the determined address information about the router; and performing the one-to-one interconnection with the communication terminal on said another network in accordance with the exchanged address information.

* * * * *